United States Patent
Kemmerer et al.

(10) Patent No.: US 12,229,472 B2
(45) Date of Patent: Feb. 18, 2025

(54) HEARING AUGMENTATION AND WEARABLE SYSTEM WITH LOCALIZED FEEDBACK

(71) Applicant: Bose Corporation, Framingham, MA (US)

(72) Inventors: Jeremy Kemmerer, Holliston, MA (US); Elio Querze, III, Arlington, MA (US); Shuo Zhang, Cambridge, MA (US); Christopher Alexis Kotelly, Boston, MA (US); Junyan Jiang, Shanghai (CN); Chuan-Che Huang, Framingham, MA (US); Lauren Westendorf, Boston, MA (US); Todd R. Reily, North Reading, MA (US); Trevor Caldwell, Brighton, MA (US); Yang Liu, Boston, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 18/124,949

(22) Filed: Mar. 22, 2023

(65) Prior Publication Data
US 2023/0229383 A1 Jul. 20, 2023

Related U.S. Application Data

(63) Continuation of application No. PCT/US2021/049008, filed on Sep. 3, 2021, which is
(Continued)

(51) Int. Cl.
*G06F 3/16* (2006.01)
*G10L 25/78* (2013.01)
*H04R 1/10* (2006.01)

(52) U.S. Cl.
CPC .............. *G06F 3/165* (2013.01); *G10L 25/78* (2013.01); *H04R 1/10* (2013.01)

(58) Field of Classification Search
CPC .......... G06F 3/165; G06F 3/016; G06F 3/017; G06F 3/011; G10L 25/78; H04R 1/10;
(Continued)

(56) References Cited

U.S. PATENT DOCUMENTS 6,699,127 B1 * 3/2004 Lobb ...................... A63F 13/45
463/43
6,921,336 B1 * 7/2005 Best ...................... A63F 13/843
463/40
(Continued)

OTHER PUBLICATIONS

International Search Report and Written Opinion dated Dec. 10, 2021 for International Application No. PCT/US2021/049008.

*Primary Examiner* — Nicholas Augustine
(74) *Attorney, Agent, or Firm* — Patterson + Sheridan, LLP

(57) ABSTRACT

Aspects of the present disclosure provide techniques, including devices and system implementing the techniques, to provide feedback to a user of an event when the user is wearing a wearable device. For example, the wearable device may provide high quality noise canceling audio playback to the user, lowering the user's situation awareness. The techniques include measuring ambient sound using two or more microphones on the wearable device. The measured ambient sound is used to determine a related event worth relaying to the user. Based on the location attribute and sound properties, the nature and/or classification of the event may be ascertained using pattern recognition algorithms according to user threshold settings. Insignificant events that the user prefers to ignore will be ruled out by the algorithm. Upon determining the event that merits the user's (Continued)

attention, the wearable device provides feedback to the user indicating the nature and location of the event.

23 Claims, 13 Drawing Sheets

Related U.S. Application Data a continuation-in-part of application No. 17/027,919, filed on Sep. 22, 2020, now Pat. No. 11,467,666.

(58) Field of Classification Search
CPC ........ H04R 2420/07; H04R 5/04; H04R 3/04; H04W 4/80
See application file for complete search history.

(56) References Cited

U.S. PATENT DOCUMENTS

| | | | | |
|---|---|---|---|---|
| 8,632,409 | B2* | 1/2014 | Wolfson | A63F 13/335 345/473 |
| 11,085,814 | B2* | 8/2021 | Papanagiotou | G06F 11/3093 |
| 2007/0094585 | A1* | 4/2007 | Ando | G11B 27/034 |
| 2007/0136679 | A1* | 6/2007 | Yang | H04N 21/4325 348/E5.102 |
| 2007/0200871 | A1* | 8/2007 | Lee | G06F 3/04815 345/619 |
| 2009/0063983 | A1* | 3/2009 | Amidon | G06N 3/006 715/733 |
| 2009/0083665 | A1* | 3/2009 | Anttila | G06F 3/0482 715/834 |
| 2009/0165000 | A1* | 6/2009 | Gyorfi | H04L 12/1822 718/102 |
| 2010/0251031 | A1* | 9/2010 | Nieh | G06F 11/3476 714/45 |
| 2010/0260487 | A1* | 10/2010 | Zbeda | A63F 13/497 707/E17.014 |
| 2010/0318204 | A1* | 12/2010 | Daisy | G06F 3/0488 345/173 |
| 2011/0107220 | A1* | 5/2011 | Perlman | H04N 21/2381 715/720 |
| 2011/0134034 | A1* | 6/2011 | Daniel | A63F 13/218 345/158 |
| 2011/0191674 | A1* | 8/2011 | Rawley | G06F 3/016 715/702 |
| 2011/0221692 | A1* | 9/2011 | Seydoux | A63H 30/04 345/173 |
| 2015/0222977 | A1* | 8/2015 | Angel, Jr. | H04R 1/105 381/74 |
| 2015/0302625 | A1* | 10/2015 | Greco | A63F 13/577 345/633 |
| 2016/0379621 | A1* | 12/2016 | Marti | B60Q 9/00 381/71.4 |
| 2018/0167715 | A1* | 6/2018 | Graylin | G06F 3/165 |
| 2020/0135163 | A1* | 4/2020 | Lovitt | G10K 11/17837 |
| 2020/0329333 | A1* | 10/2020 | Norris | H04S 7/304 |

\* cited by examiner

HEARING AUGMENTATION AND WEARABLE SYSTEM WITH LOCALIZED FEEDBACK

CROSS-REFERENCE TO RELATED APPLICATION

This application is a continuation application and claims benefit of International Application No. PCT/US21/49008, filed Sep. 3, 2021, which was an international application filing and claims benefit of and priority to U.S. patent application Ser. No. 17/027,919, filed Sep. 22, 2020, now U.S. Pat. No. 11,467,666, which was patented on Oct. 11, 2022. The contents of each of the aforementioned applications are herein incorporated by reference in their entirety.

FIELD

Aspects of the disclosure generally relate to wireless communication, and more specifically to audio signal processing involving a wearable device in wireless communication with a computing device.

BACKGROUND

Wearable devices may provide a user desired transmitted or reproduced audio experiences by masking, proofing against, or canceling ambient noises. High volume output or white noises generated by the wearable devices may mask ambient noises. Soundproofing reduces sound pressure by reflecting or absorbing sound energy. Noise cancellation, or active noise control/reduction, reduces ambient noises by the addition of a second sound that cancels the ambient noises. In these cases, the user may fail to pay attention to events that require attention, such as alarms, warning sounds, or verbal communications in the environment. Furthermore, if the user is focused on the task at hand, the user may lack other senses (e.g., visual) that would otherwise be available to inform the user regarding such events.

Accordingly, methods for providing users adequate and non-intrusive (e.g., preserving the desired audio experiences) notifications regarding certain background events, as well as apparatuses and systems configured to implement these methods are desired.

SUMMARY

All examples and features mentioned herein can be combined in any technically possible manner.

Aspects of the present disclosure provide a method for providing feedback to a user of a wearable device. The method includes measuring ambient sound using two or more microphones on the wearable device; determining an event based on the measured ambient sound; determining a location attribute of the event relative to the wearable device; and providing feedback to the user based on the event and the location attribute.

In aspects, providing feedback to the user based on the event and the location attribute includes playing a spatialized audio cue in addition to the audio content.

In aspects, determining the event based on the measured ambient sound includes: measuring a magnitude of a sound level of the event; and determining a location of the event relative to the wearable device using audio signals associated with the event, wherein the location of the event is determined based on a direction and a distance processed from the audio signals and wherein the location attribute of the event includes at least one of the direction or the distance. In some cases, determining the event based on the ambient sound further includes ruling out incidents of events based on at least one of: the location of the event relative to the wearable device; a recurring pattern in the audio signals associated with the event; or an attribute of the audio signals associated with the event.

In aspects, determining the event based on the measured ambient sound includes determining that the magnitude of the sound level of the event exceeds a threshold value corresponding to the location of the event relative to the wearable device. In some cases, the threshold value varies based on the location of the event relative to the wearable device and the threshold value increases as the location of the event becomes closer to the user.

In aspects, determining the event based on the ambient sound is based, at least in part, on correlating: i) the location of the event relative to the wearable device, ii) the recurring pattern in the audio signals associated with the event, and iii) the attribute of the audio signal associated with the event. In some cases, determining the event is based, at least in part, on a deep learning analysis performed by artificial intelligence using data of the location of the event relative to the wearable device, the recurring pattern in the audio signals associated with the event, and the attribute of the audio signal associated with the event.

In aspects, providing feedback to the user based on the event includes at least one of: playing a spatialized sound using at least one speaker of the wearable device; providing a direction-indicative tactile notification using the wearable device; or displaying a notification on one or more devices connected to the wearable device.

In some cases, the spatialized sound represents a location of the determined event relative to the user, wherein the represented location is based on at least the location attribute.

In aspects, the method further includes determining the user is in a focused state based on a pattern of motion signals measured by the wearable device, wherein providing feedback to the user based on the event and the location attribute is based on the determined focused state. In some cases, determining the user is in the focused state includes processing the pattern of motion signals measured by one or more inertia measurement units (IMUS) disposed on the wearable device.

In aspects, the two or more microphones on the wearable device includes at least three microphones positioned to measure the ambient sound surrounding the user.

In aspects, the wearable device is an audio device worn on at least one of the head or neck of the user.

In aspects, the wearable device includes at least one of over-ear headphones, on-ear headphones, in-ear headphones, earbuds, truly wireless earbuds, glasses, a headband, a neckband, ear hooks, ear clips, a head-worn audio device, or a neck-worn audio device.

In aspects, the wearable device is a noise cancelling audio device.

Aspects of the present disclosure provide a system for providing a user spatialized feedback. The system includes a wearable device having two or more microphones configured to measure ambient sound; and a computing device connected with the wearable device. The computing device is configured to: determine an event based on the measured ambient sound, determine a location attribute of the event relative to the wearable device; and cause feedback to be provided to the user based on the event and the location attribute.

In aspects, the wearable device further includes two or more speakers configured to: play an audio content canceling the measured ambient sound; and alert the user of the determined event by playing a spatialized audio cue in addition to the audio content.

In aspects, the wearable device further includes an actuator for providing a tactile feedback in response to the computing device providing feedback to the user based on the event.

In aspects, the computing is further configured to rule out incidents of events based on at least one of: the location of the event relative to the wearable device; a recurring pattern in the audio signals associated with the event; or an attribute of the audio signals associated with the event.

Aspects of the present disclosure provide a method for providing feedback to a user of a wearable device including: measuring ambient sound using two or more microphones on the wearable device; determining an event based on the measured ambient sound exceeding a threshold, wherein the threshold varies in two or more different configuration events corresponding to two or more different situational criteria; and providing feedback to the user based on the determined event.

In aspects, each of the two or more different situational criteria includes a customization configuration on at least one of: the threshold associated with the determined event; a location attribute of the event relative to the wearable device; or the feedback to the user based on the determined event.

In aspects, the customization configuration is input by the user.

In aspects, the method further including: associating the customization configuration and the location attribute of the determined event relative to the wearable device; and identifying a pattern based on the input by the user and the association for determining a general rule of configuration based on the location attribute.

In aspects, the customization configuration includes a default factory configuration.

In aspects, each of the two or more different situational criteria includes a location attribute relative to the wearable device, the location attribute determined based on the ambient sound measured using the two or more microphones of the wearable device.

In aspects, the threshold includes a minimal or maximal distance corresponding to one of the two or more different situational criteria.

In aspects, the threshold includes a direction corresponding to one of the two or more different situational criteria.

In aspects, each of the two or more different situational criteria corresponds to a physical location of the wearable device.

In aspects, each of the two or more different situational criteria includes a sound class including at least one of a speech, a background sound, or a musical sequence.

In aspects, the background sound includes an alarm, a foot step noise, a traffic noise, or a pattern of sounds.

In aspects, the threshold includes a minimal sound level corresponding to one of the two or more different situational criteria.

In aspects, the threshold corresponds to a sensitivity of the one of the two or more different situational criteria.

In aspects, providing the feedback includes playing a recorded copy of the ambient sound to the user.

In aspects, playing the recorded copy includes amplifying or attenuating the recorded copy of the ambient sound based on data gathered by a feedback microphone in the wearable device.

In aspects, amplifying or attenuating the recorded copy of the ambient sound is triggered by a movement of the wearable device.

In aspects, playing the recorded copy includes delaying playing the recorded copy based on the movement of the wearable device.

In aspects, the method further includes correlating the ambient sound and the location attribute for a period of time; generating a salience map mapping a variation of the ambient sound over the period of time at different locations; measuring a movement record of the wearable device over the period of time; and determining a response of the user based on a relationship between the movement record and the salience map.

In aspects, determining the event further includes: transmitting the measured ambient sound to a second device for processing; and receiving, from the second device, the determined event and the corresponding feedback to provide to the user, wherein the second device has a greater processing capacity than the wearable device.

Two or more features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

BRIEF DESCRIPTION OF THE DRAWINGS

Like numerals indicate like elements.

DETAILED DESCRIPTION

Figure 1:
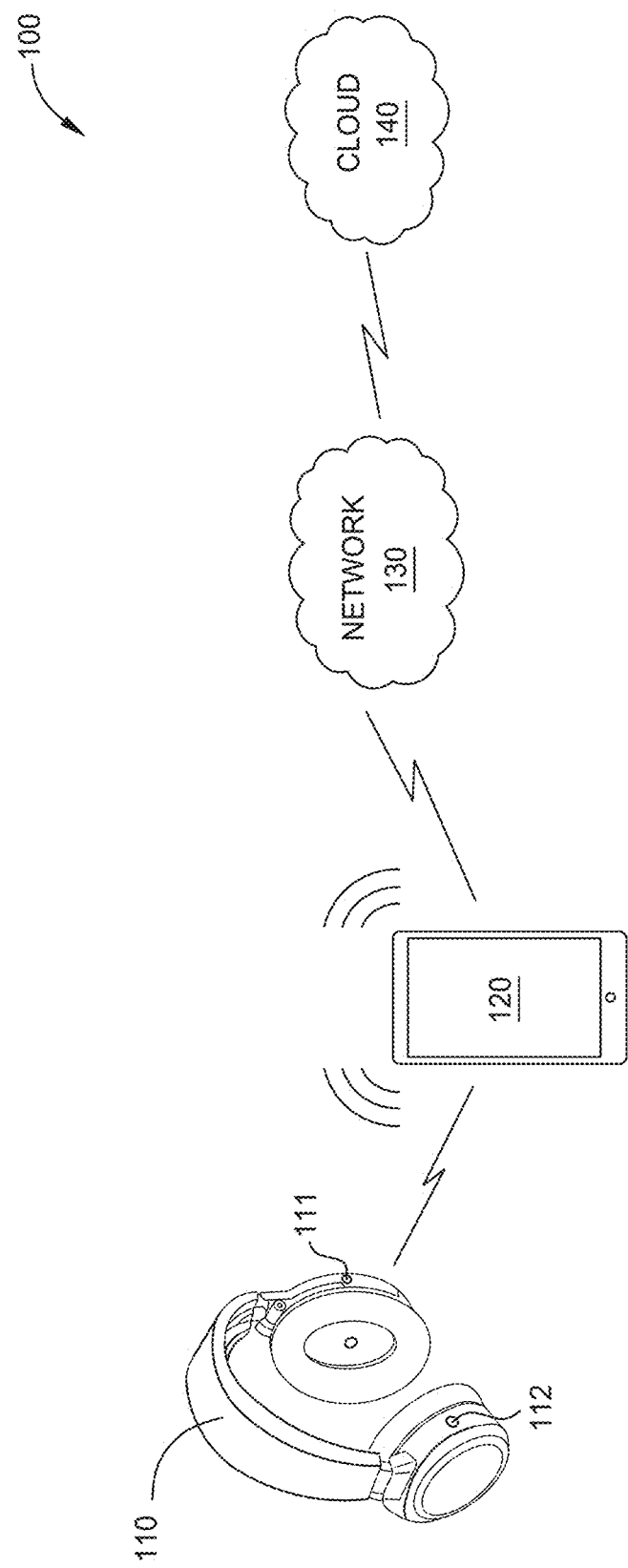
FIG. 1 illustrates an example system in which aspects of the present disclosure may be implemented.

The present disclosure provides processes, methods, systems, and devices for providing feedback to a user of an event (e.g., a barge-in event, or one that requires the user's attention and not one that the user ignores) when the user is wearing a wearable audio output device. For example, the user may, absent the feedback, fail to pay attention to the event due to, for example, enjoying an audio experience provided by the wearable device, such as when the wearable device cancels ambient noises to allow the user fully submerge in the audio experience. According to the present disclosure, the wearable device may determine an event based on certain conditions, such as a sound location relative to the user, a sound class (e.g., the nature of detected sounds, such as speech, alarm, etc.), the environment (e.g., at home, in the office or a particular room, in the public, etc.), as well as other conditions to be defined by customized parameters.

In aspects, the method includes measuring an ambient sound (i.e., the sound that is not part of the audio experience) using two or more microphones on the wearable device. The event is determined based on the measured ambient sound. A location attribute of the event is determined (this may be referred to as "localization"). Feedback of the determined event and the location attribute is then provided to the user. In some cases, determining the event based on the measured ambient sound employs algorithms based on deep learning that identifies and removes happenings in the surroundings that do not require the user's attention. The algorithms may use loudness, location, and various characteristics of the sounds in the ambient sound to determine the event. The feedback of the determined event may be presented to the user, the feedback including, for example, the location attribute and/or letting the user know where attention should be directed.

In aspects, the event is determined based on the measured ambient sound exceeding a threshold. The threshold may vary for two or more different configuration events corresponding to two or more different situational criteria. The two or more different situational criteria may include at least one of the threshold associated with the determined event, a location attribute of the event relative to the wearable device, or the feedback to the user based on the determined event. For example, an event including a speech and an event including door knocking may be configured with different thresholds for detection. Similarly, an event five meters away and an event ten meters away may also be configured with different threshold for detection. The threshold levels may also be customized based on the location of an event relative to the wearable device (e.g., relative distance and direction). The user may also customize forms and properties (e.g., brightness, volume, and/or magnitude) of the feedback, such as visual, audio, a combination thereof, and other forms.

Users often lose at least some situational awareness when using wearable audio devices, especially when using active noise canceling headphones that are intended to remove ambient sound. In another example, situational awareness is decreased when the volume of the audio at an excessive level that masks over ambient sound or having good soundproofing (e.g., passive sound insulation). Another example of situational awareness is decreased when the user is in a focused state, such as when working, studying, or reading, with the aid of the wearable audio device (e.g., canceling or attenuating ambient sound). Reduced situational awareness may result in costly or troublesome consequences, such as when the event merits a timely response. The present disclosure provides techniques to provide spatialized feedback to the user of events that may merit attention, while providing an enjoyable audio experience to the user.

In aspects, the disclosed techniques may augment a user's awareness using sound event detection and audio cues representing the detected sound event. In a working or working-from-home environment, the user may be in a focused state and less aware of the user's surroundings. A noise canceling wearable device may further reduce the user's awareness. The user may want or need to pay attention to incoming verbal communications, door bells, or other alarms or sound notifications that may be effectively cancelled by the wearable device. As such, the disclosed techniques allow the user to focus and benefit from noise-canceling wearable devices without losing situational awareness. In some cases, the audio cues are designed to be informative and minimally disruptive. This allows the user to determine, after learning about the event, when and how to react to the event while maintaining the option to ignore the event. In aspects, additional visualization or notification strategies are used together with the audio cues to help the user interpret the event.

The disclosed techniques are implemented using a combination of microphones and inertia measurement units (IMUs). For example, the techniques first set a loudness threshold to detect barge-in events that are different from base-level noises. This step may be referred to as "event detection". The techniques then determine one or more location attributes of the barge-in events, such as identifying a direction and distance of the events. The techniques then use inputs from the IMUs to determine whether the user may be causing or already is aware of the detected events. If the event is determined to merit the user's attention, the techniques further include providing spatialized audio feedback to the user, informing the user of the location of the event.

In aspects, in addition to the location attributes of the barge-in events, different thresholds may be defined or configured for different configuration events. The configuration events may be defined by corresponding situational criteria, such as a decibel level (e.g., event threshold), a property of the ambient sound (e.g., a sound class or type, such as a speech, an alarm, a melody, etc.), a location relative to the user (e.g., distance and direction). The situational criteria may be provided by the user or may be configured using a default factory or production profile or configuration. For example, the user may, via a graphical interface on the wearable device or on a computer device in communication with the wearable device, provide input to customize the customization configuration. Examples are further discussed in relation to FIGS. 9-10.

In aspects, localization and event detection are performed on the wearable device to minimize latency and provide access to a full array of microphones thereon. The user may be prompted with a spatialized audio cue in the direction of the event (e.g., left or right, above or below) when the following example operations are performed. First, an activity detection algorithm is executed using the microphones on the wearable device and connected/controlled by a processor (either on the wearable device or on an external computing device). As mentioned, the activity detection algorithm may be running at the wearable device to minimize transmission latency. In some cases, the activity detection algorithm may be running at a computing device in wireless communication with the wearable device in order to use a more powerful processor in the computing device. The activity detection algorithm detects a sudden change of sound energy (e.g., a sudden decibel level increase) to identify an event separate from the ambient sound. The activity detection algorithm detects a characteristic of sound, such as speeches or a voice activity, to identify an event separate from the ambient sound.

Second, a location attribute of the event is determined and a second layer of data processing ascertains the nature of the event. For example, by determining the distance of the event, the activity detection algorithm may further distinguish sounds created by the user (e.g., the user's own speech) from sounds of an event in the far field (e.g., door knocking sound across the room). In some cases, events that are determined to be facing the user (i.e., in front of the user within certain distance) are disregarded, as such events can be visually acquired by the user. The location attribute may include distance, direction, or both. The distance and direction may be computed using audio data captured by two or more microphones spaced apart in the wearable device.

Ascertaining the nature of the event may also include processing the sound to determine a sound class and/or a sound property. For example, different configuration events may correspond to different sound classes, such as speech, alarm, or loud background events (e.g., knocking, crying, and the like). Threshold for each event of a specific nature may be adjusted or personalized using different sensitivity settings, and thus depend on the user's environment and preferences.

Third, a movement measurement is correlated with the event to determine whether the user needs to be notified regarding the event. For example, a lack of movement measured by motion sensors may indicate the user is in a focused state. The user may more likely desire feedback of an event while in a focused state. In addition, the movement measurement may help the activity detection algorithm correctly identify the location attribute, taking into consideration the relative location variations caused by the user's own movements.

In some cases, the movement measurement may form a pattern associated with the customization configuration and the location attribute of the determined event. For example, the user may consistently/habitually respond to an event by turning toward a direction. The pattern of such movement is then correlated with the event. The event may be detected by associating the customization configuration and the location attribute relative to the wearable device, such as by specifying a threshold value based on the sound class associated with where the sound comes from. In one example, when a user wears the wearable device at a constant location facing toward a constant direction, siren sounds coming through a window may be noise-cancelled and ignored (i.e., not classified as an event for feedback). In such cases, random movement may be recorded when the siren is measured. A general rule may be determined, based on the random movement, to ignore such siren sounds coming from the same direction. By comparison, knocking sounds coming through a door may frequently accompanied by the user turning toward a certain direction. The pattern of such response may be recorded and identified for determining a general rule of configuration, such as to provide a feedback (e.g., an audio notification in the wearable device, while the knocking sounds have been noise-cancelled) when events fitting the identified pattern have been detected.

In aspects, the activity detection algorithm may include lightweight, threshold-based digital signal processing (DSP) algorithms running on processors embedded in the wearable device. The wearable device may provide a user interface, such as a sensitivity slider, for controlling a threshold that adjusts detection sensitivity. For example, a more sensitive setting leads to reporting events with less scrutiny and may result in increased false-positive detections. In addition to providing spatialized audio cues to the user, the wearable device may further provide information to the external computing device. The external computing device may display the event and its location attribute on a user interface. In an example, the user interface shows a "radar" display that informs the user about the nature of the event (e.g., type of event, such as speech, knocking sound, alarm, etc.) and location of the event relative to the user.

In some cases, the activity detection algorithm includes, or process concurrently with, an event analysis algorithm running on an external computing device. The event analysis algorithm may include a deep learning algorithm that performs various layers of processing to be trained regarding specific preference of the user. For example, the user may provide feedback or indications in the event analysis algorithm to teach the event analysis algorithm about the nature and priority of events detected by the wearable device. In an example, the event analysis algorithm is trained to recognize certain speech data (e.g., of a certain person, of a certain category, etc.) and upon recognition, transcribe the speech data into text. The event analysis algorithm may classify the event into different priority levels based on the recognition: for example, a fire alarm may have a higher priority than a door bell. In aspects, the event analysis algorithm on the computing device may access to the two or more microphones of the wearable device via wireless connection, such as using near field communication (e.g., Bluetooth). In aspects, the event analysis algorithm may be combined with, or work concurrently with the activity detection algorithm running on the wearable device. In some cases, the event analysis algorithm and the activity detection algorithm may be collectively referred to as the event determination algorithm.

FIG. 1 illustrates an example system 100 in which aspects of the present disclosure are practiced. As shown, system 100 includes a wearable device 110 communicatively coupled with a computing device 120. The wearable device 110 is illustrated as a headset that includes two or more speakers and two or more microphones. The computing device 120 is illustrated as a smartphone or a tablet computer wirelessly paired with the wearable device 110. At a high level, the wearable device 110 may play audio content transmitted from the computing device 120. The user may use the graphical user interface (GUI) on the computing device 120 to select the audio content and/or adjust settings of the wearable device 110. The wearable device 110 provides soundproofing, active noise cancellation, and/or other audio enhancement features to play the audio content transmitted from the computing device 120. According to aspects of the present disclosure, upon determining events that require the user's attention, the wearable device 110 and/or the computing device 120 may provide a non-intrusive, spatialized notification or feedback to the user regarding the events and location attributes thereof.

In an aspect, the wearable device 110 includes at least two microphones 111 and 112 to capture ambient sound. The captured sound may be used for active noise cancellation and/or event detection. For example, the microphones 111 and 112 are positioned on opposite side of the wearable device 110. The audio signals captured by the microphones 111 and 112 may be correlated and/or triangulated to determine location attributes of detected events. In aspects, additional microphones positioned at different locations of the wearable device 110 may be used to enhance the accuracy of the location determination.

In an aspect, the headphones 110 include voice activity detection (VAD) circuitry capable of detecting the presence of speech signals (e.g. human speech signals) in a sound signal received by the microphones 111, 112 of the headphones 110. For instance, the microphones 111, 112 of the headphones 110 can receive ambient external sounds in the vicinity of the headphones 110, including speech uttered by the user. The sound signal received by the microphones 111, 112 may have the speech signal mixed in with other sounds in the vicinity of the headphones 110. Using the VAD, the headphones 110 can detect and extract the speech signal from the received sound signal. In an aspect, the VAD circuitry can be used to detect and extract speech uttered by the user in order to facilitate a voice call, voice chat between the user and another person, or voice commands for a virtual personal assistant (VPA), such as a cloud based VPA. In other examples, detections or triggers can include self-VAD (only starting up when the user is speaking, regardless of whether others in the area are speaking), active transport (sounds captured from transportation systems), head gestures, buttons, computing device based triggers (e.g., pause/un-pause from the phone), changes with input audio level, audible changes in environment, among others. The voice activity detection circuitry may run or assist running the activity detection algorithm disclosed herein.

The wearable device 110 further includes hardware and circuitry including processor(s)/processing system and memory configured to implement one or more sound management capabilities or other capabilities including, but not limited to, noise canceling circuitry (not shown) and/or noise masking circuitry (not shown), body movement detecting devices/sensors and circuitry (e.g., one or more accelerometers, one or more gyroscopes, one or more magnetometers, etc.), geolocation circuitry and other sound processing circuitry.

In an aspect, the wearable device 110 is wirelessly connected to the computing device 120 using one or more wireless communication methods including, but not limited to, Bluetooth, Wi-Fi, Bluetooth Low Energy (BLE), other RF-based techniques, or the like. In an aspect, the wearable device 110 includes a transceiver that transmits and receives data via one or more antennae in order to exchange audio data and other information with the computing device 120.

In an aspect, the wearable device 110 includes communication circuitry capable of transmitting and receiving audio data and other information from the computing device 120. The wearable device 110 also includes an incoming audio buffer, such as a render buffer, that buffers at least a portion of an incoming audio signal (e.g., audio packets) in order to allow time for retransmissions of any missed or dropped data packets from the computing device 120. For example, when the wearable device 110 receives Bluetooth transmissions from the computing device 120, the communication circuitry typically buffers at least a portion of the incoming audio data in the render buffer before the audio is actually rendered and output as audio to at least one of the transducers (e.g., audio speakers) of the wearable device 110. This is done to ensure that even if there are RF collisions that cause audio packets to be lost during transmission, that there is time for the lost audio packets to be retransmitted by the computing device 120 before they have to be rendered by the wearable device 110 for output by one or more acoustic transducers of the wearable device 110.

The audio output device 110 is illustrated as over the head headphones; however, the techniques described herein apply to other wearable devices, such as wearable audio devices, including any audio output device that fits around, on, in, or near an ear (including open-ear audio devices worn on the head or shoulders of a user) or other body parts of a user, such as head or neck. The wearable device 110 may take any form, wearable or otherwise, including standalone devices (including automobile speaker system), stationary devices (including portable devices, such as battery powered portable speakers), headphones, earphones, earpieces, headsets, goggles, headbands, earbuds, armbands, sport headphones, neckband, or eyeglasses.

In an aspect, the wearable device 110 is connected to the computing device 120 using a wired connection, with or without a corresponding wireless connection. The computing device 120 can be a smartphone, a tablet computer, a laptop computer, a digital camera, or other computing device that connects with the wearable device 110. As shown, the computing device 120 can be connected to a network 130 (e.g., the Internet) and can access one or more services over the network. As shown, these services can include one or more cloud services 140.

In an aspect, the computing device 120 can access a cloud server in the cloud 140 over the network 130 using a mobile web browser or a local software application or "app" executed on the computing device 120. In an aspect, the software application or "app" is a local application that is installed and runs locally on the computing device 120. In an aspect, a cloud server accessible on the cloud 140 includes one or more cloud applications that are run on the cloud server. The cloud application can be accessed and run by the computing device 120. For example, the cloud application can generate web pages that are rendered by the mobile web browser on the computing device 120. In an aspect, a mobile software application installed on the computing device 120 or a cloud application installed on a cloud server, individually or in combination, may be used to implement the techniques for low latency Bluetooth communication between the computing device 120 and the wearable device 110 in accordance with aspects of the present disclosure. In an aspect, examples of the local software application and the cloud application include a gaming application, an audio AR application, and/or a gaming application with audio AR capabilities. The computing device 120 may receive signals (e.g., data and controls) from the wearable device 110 and send signals to the wearable device 110.

Figure 2A:
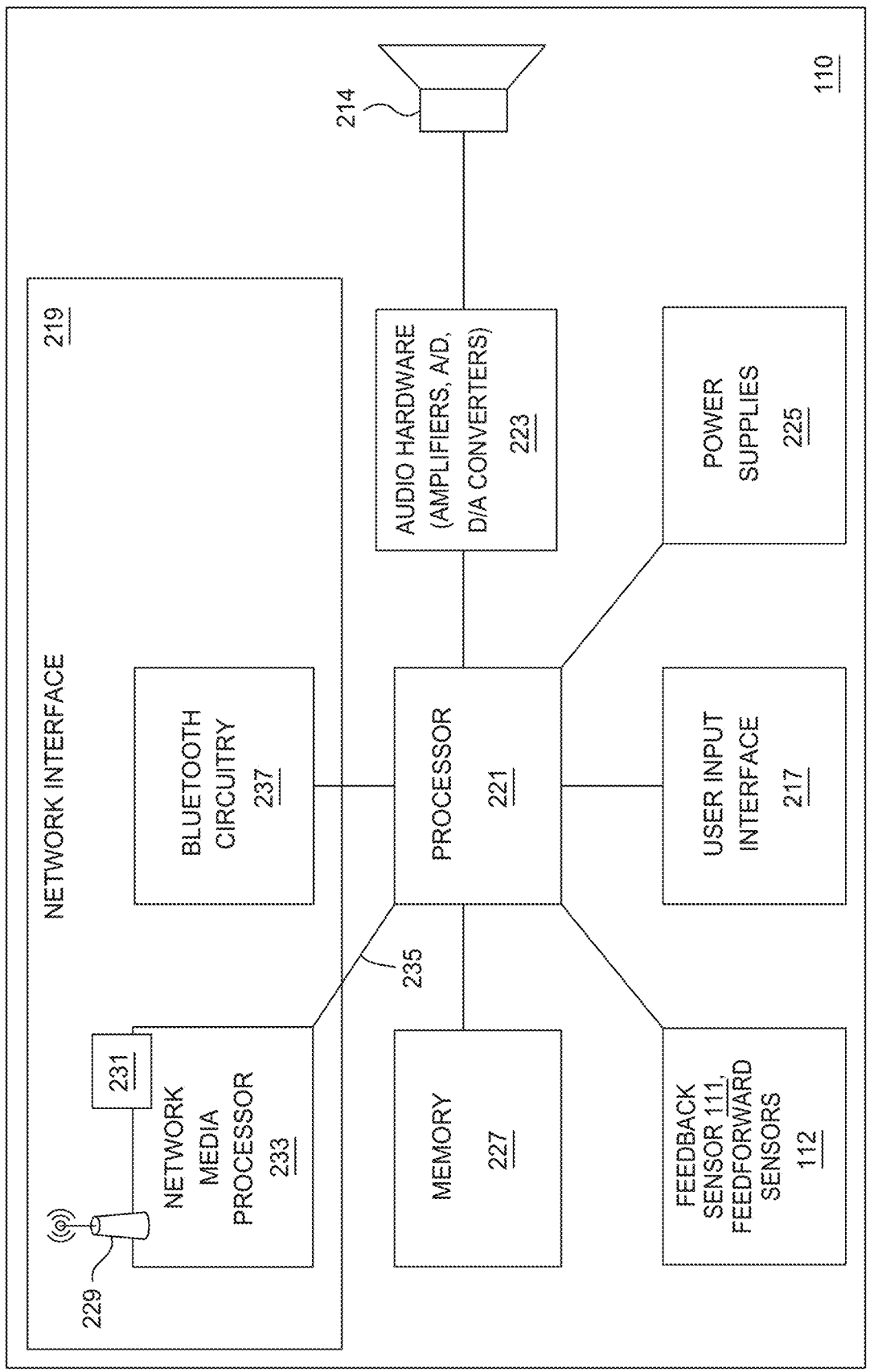
FIG. 2A illustrates an exemplary wireless audio device, in accordance with certain aspects of the present disclosure.

FIG. 2A illustrates an exemplary wearable device 110 and some of its components. Other components may be inherent in the wearable device 110 and not shown in FIG. 2A. For example, the wearable device 110 may include an enclosure that houses an optional graphical interface (e.g., an OLED display) which can provide the user with information regarding currently playing ("Now Playing") music.

The wearable device 110 includes one or more electro-acoustic transducers (or speakers) 214 for outputting audio. The wearable device 110 also includes a user input interface 217. The user input interface 217 can include a plurality of preset indicators, which can be hardware buttons. The preset indicators can provide the user with easy, one press access to entities assigned to those buttons. The assigned entities can be associated with different ones of the digital audio sources such that a single wearable device 110 can provide for single press access to various different digital audio sources.

The sensor 111 and 112 may include two or more microphones for capturing ambient sound and provide audio signals for determining location attributes of events. For example, the sensors 111 and 112 may provide a mechanism for determining sound arrival differences at the wearable device 110 to ascertain the location attributes. In some cases, the sensors 111 and 112 may capture transmission delays, which may be used to reduce errors in subsequent computation. The sensors 111 and 112 may each provide two or more channels of audio signals. The audio signals are captured by microphones that are spaced apart and may have different directional responses. The two or more channels of audio signals may be used for calculating directional attributes of an event of interest.

As shown in FIG. 2A, the wearable device 110 includes an acoustic driver or speaker 214 to transduce audio signals to acoustic energy through the audio hardware 223. The wearable device 110 also includes a network interface 219, at least one processor 221, audio hardware 223, power supplies 225 for powering the various components of the wearable device 110, and memory 227. In an aspect, the processor 221, the network interface 219, the audio hardware 223, the power supplies 225, and the memory 227 are interconnected using various buses 235, and several of the components can be mounted on a common motherboard or in other manners as appropriate.

The network interface 219 provides for communication between the wearable device 110 and other electronic computing devices via one or more communications protocols. The network interface 219 provide seither or both of a wireless network interface 229 and a wired interface 231 (optional). The wireless interface 229 allows the wearable device 110 to communicate wirelessly with other devices in accordance with a wireless communication protocol such as IEEE 802.11. The wired interface 231 provides network interface functions via a wired (e.g., Ethernet) connection for reliability and fast transfer rate, for example, used when the wearable device 110 is not worn by a user. Although illustrated, the wired interface 231, is optional.

In certain aspects, the network interface 219 includes a network media processor 233 for supporting Apple AirPlay® and/or Apple Airplay® 2. For example, if a user connects an AirPlay® or Apple Airplay® 2 enabled device, such as an iPhone or iPad device, to the network, the user can then stream music to the network connected audio playback devices via Apple AirPlay® or Apple Airplay® 2. Notably, the audio playback device can support audio-streaming via AirPlay®, Apple Airplay® 2 and/or DLNA's UPnP protocols, and all integrated within one device.

All other digital audio received as part of network packets may pass straight from the network media processor 233 through a USB bridge (not shown) to the processor 221 and runs into the decoders, DSP, and eventually is played back (rendered) via the electro-acoustic transducer(s) 214.

The network interface 219 can further include a Bluetooth circuitry 237 for Bluetooth applications (e.g., for wireless communication with a Bluetooth enabled audio source such as a smartphone or tablet) or other Bluetooth enabled speaker packages. In some aspects, the Bluetooth circuitry 237 may be the primary network interface 219 due to energy constraints. For example, the network interface 219 may use the Bluetooth circuitry 237 solely for mobile applications when the wearable device 110 adopts any wearable form. For example, BLE technologies may be used in the wearable device 110 to extend battery life, reduce package weight, and provide high quality performance without other backup or alternative network interfaces.

In an aspect, the network interface 219 supports communication with other devices using multiple communication protocols simultaneously at one time. For instance, the wearable device 110 can support Wi-Fi/Bluetooth coexistence and can support simultaneous communication using both Wi-Fi and Bluetooth protocols at one time. For example, the wearable device 110 can receive an audio stream from a smart phone using Bluetooth and can further simultaneously redistribute the audio stream to one or more other devices over Wi-Fi. In an aspect, the network interface 219 may include only one RF chain capable of communicating using only one communication method (e.g., Wi-Fi or Bluetooth) at one time. In this context, the network interface 219 may simultaneously support Wi-Fi and Bluetooth commmunications by time sharing the single RF chain between Wi-Fi and Bluetooth, for example, according to a time division multiplexing (TDM) pattern.

Streamed data may pass from the network interface 219 to the processor 221. The processor 221 can execute instructions (e.g., for performing, among other things, digital signal processing, decoding, and equalization functions), including instructions stored in the memory 227. The processor 221 can be implemented as a chipset of chips that includes separate and multiple analog and digital processors. The processor 221 can provide, for example, for coordination of other components of the audio wearable device 110, such as control of user interfaces.

In certain aspects, the protocols stored in the memory 227 may include BLE according to, for example, the Bluetooth Core Specification Version 5.2 (BT5.2). The wearable device 110 and the various components therein are provided herein to sufficiently comply with or perform aspects of the protocols and the associated specifications. For example, BT5.2 includes enhanced attribute protocol (EATT) that supports concurrent transactions. A new L2CAP mode is defined to support EATT. As such, the wearable device 110 includes hardware and software components sufficiently to support the specifications and modes of operations of BT5.2, even if not expressly illustrated or discussed in this disclosure. For example, the wearable device 110 may utilize LE Isochronous Channels specified in BT5.2.

The processor 221 provides a processed digital audio signal to the audio hardware 223 which includes one or more digital-to-analog (D/A) converters for converting the digital audio signal to an analog audio signal. The audio hardware 223 also includes one or more amplifiers which provide amplified analog audio signals to the electroacoustic transducer(s) 214 for sound output. In addition, the audio hardware 223 can include circuitry for processing analog input signals to provide digital audio signals for sharing with other devices, for example, other speaker packages for synchronized output of the digital audio.

The memory 227 can include, for example, flash memory and/or non-volatile random access memory (NVRAM). In some aspects, instructions (e.g., software) are stored in an information carrier. The instructions, when executed by one or more processing devices (e.g., the processor 221), perform one or more processes, such as those described elsewhere herein. The instructions can also be stored by one or more storage devices, such as one or more computer or machine-readable mediums (for example, the memory 227, or memory on the processor). The instructions can include instructions for performing decoding (i.e., the software modules include the audio codecs for decoding the digital audio streams), as well as digital signal processing and equalization. In certain aspects, the memory 227 and the processor 221 may collaborate in data acquisition and real time processing with the feedback microphone 111 and feedforward microphones 112.

Figure 2B:
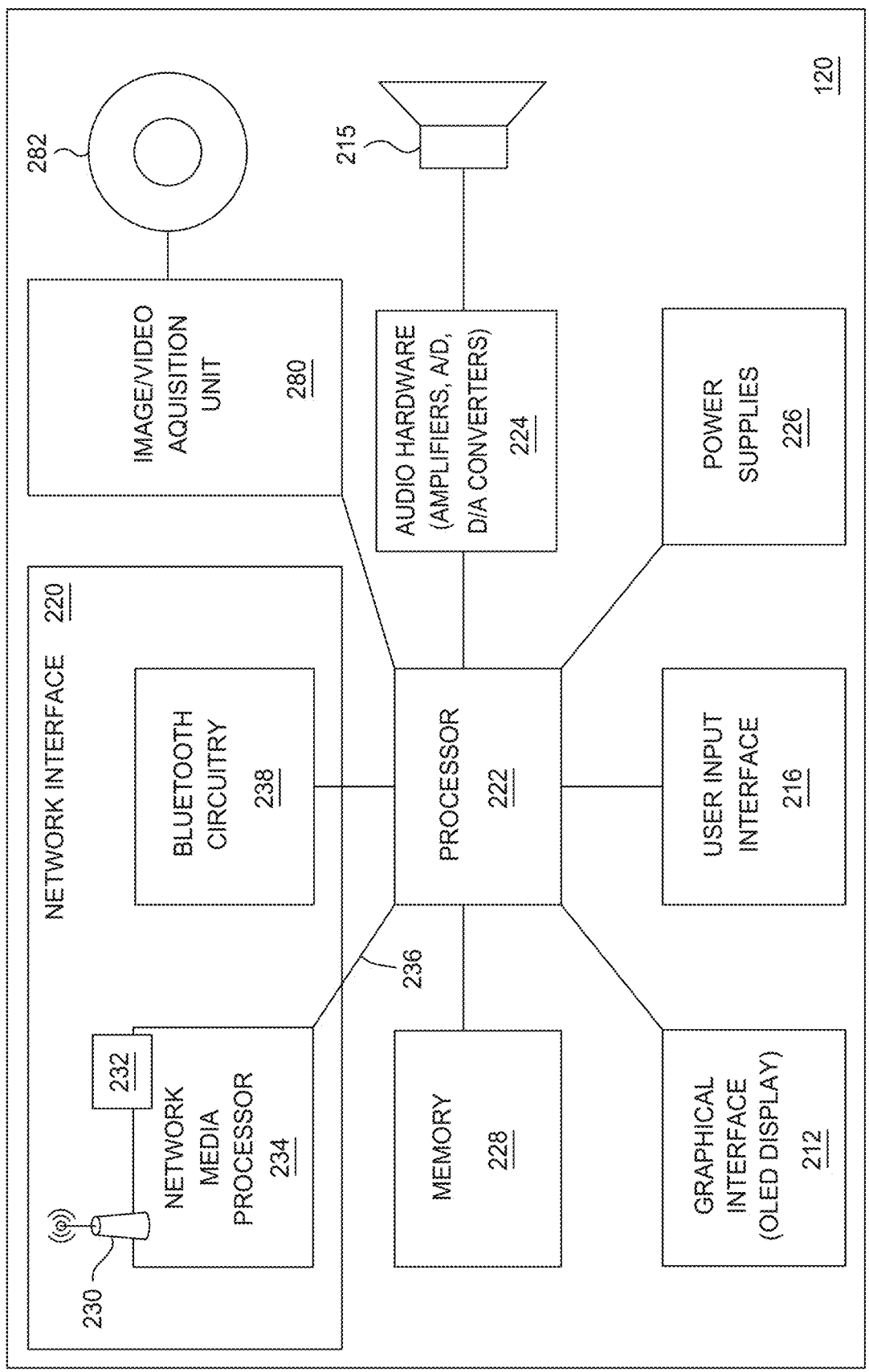
FIG. 2B illustrates an exemplary computing device, in accordance with certain aspects of the present disclosure.

FIG. 2B illustrates an exemplary computing device 120, such as a smartphone or a mobile computing device, in accordance with certain aspects of the present disclosure. Some components of the computing device 120 may be inherent and not shown in FIG. 2B. For example, the computing device 120 may include an enclosure. The enclosure may house an optional graphical interface 212 (e.g., an OLED display) as shown. The graphical interface 212 provides the user with information regarding currently playing ("Now Playing") music or video. The computing device 120 includes one or more electro-acoustic transducers 215 for outputting audio. The computing device 120 may also include a user input interface 216 that enables user input.

The computing device 120 also includes a network interface 220, at least one processor 222, audio hardware 224, power supplies 226 for powering the various components of the computing device 120, and a memory 228. In an aspect, the processor 222, the graphical interface 212, the network interface 220, the audio hardware 224, the power supplies 226, and the memory 228 are interconnected using various buses 236, and several of the components can be mounted on a common motherboard or in other manners as appropriate. In some aspects, the processor 222 of the computing device 120 is more powerful in terms of computation capacity than the processor 221 of the wearable device 110. Such difference may be due to constraints of weight, power supplies, and other requirements. Similarly, the power supplies 226 of the computing device 120 may be of a greater capacity and heavier than the power supplies 225 of the wearable device 110.

The network interface 220 provides for communication between the computing device 120 and the wearable device 110, as well as other audio sources and other wireless speaker packages including one or more networked wireless speaker packages and other audio playback devices via one or more communications protocols. The network interface 220 can provide either or both of a wireless interface 230 and a wired interface 232 (optional). The wireless interface 230 allows the computing device 120 to communicate wirelessly with other devices in accordance with a wireless communication protocol such as IEEE 802.11. The wired interface 232 provides network interface functions via a wired (e.g., Ethernet) connection.

In certain aspects, the network interface 220 can also include a network media processor 234 and Bluetooth circuitry 238, similar to the network media processor 233 and Bluetooth circuitry 237 in the wearable device 110 in FIG. 2A. Further, in aspects, the network interface 220 supports communication with other devices using multiple communication protocols simultaneously at one time, as described with respect to the network interface 219 in FIG. 2A.

All other digital audio received as part of network packets comes straight from the network media processor 234 through a USB bridge 236 to the processor 222 and runs into the decoders, DSP, and eventually is played back (rendered) via the electro-acoustic transducer(s) 215.

The computing device 120 may also include an image or video acquisition unit 280 for capturing image or video data.

For example, the image or video acquisition unit 280 may be connected to one or more cameras 282 and able to capture still or motion images. The image or video acquisition unit 280 may operate at various resolutions or frame rates according to a user selection. For example, the image or video acquisition unit 280 may capture 4K videos (e.g., a resolution of 3840 by 2160 pixels) with the one or more cameras 282 at 30 frames per second, FHD videos (e.g., a resolution of 1920 by 1080 pixels) at 60 frames per second, or a slow motion video at a lower resolution, depending on hardware capabilities of the one or more cameras 282 and the user input. The one or more cameras 282 may include two or more individual camera units having respective lenses of different properties, such as focal length resulting in different fields of views. The image or video acquisition unit 280 may switch between the two or more individual camera units of the cameras 282 during a continuous recording.

Captured audio or audio recordings, such as the voice recording captured at the wearable device 110, may pass from the network interface 220 to the processor 222. The processor 222 executes instructions within the wireless speaker package (e.g., for performing, among other things, digital signal processing, decoding, and equalization functions), including instructions stored in the memory 228. The processor 222 can be implemented as a chipset of chips that includes separate and multiple analog and digital processors. The processor 222 can provide, for example, for coordination of other components of the audio computing device 120, such as control of user interfaces and applications. The processor 222 provides a processed digital audio signal to the audio hardware 224 similar to the respective operation by the processor 221 described in FIG. 2A.

The memory 228 can include, for example, flash memory and/or non-volatile random access memory (NVRAM). In aspects, instructions (e.g., software) are stored in an information carrier. The instructions, when executed by one or more processing devices (e.g., the processor 222), perform one or more processes, such as those described herein. The instructions can also be stored by one or more storage devices, such as one or more computer or machine-readable mediums (for example, the memory 228, or memory on the processor 222). The instructions can include instructions for performing decoding (i.e., the software modules include the audio codecs for decoding the digital audio streams), as well as digital signal processing and equalization.

Example Hearing Augmentation and Wearable System with Localized Feedback

Aspects of the present disclosure provide techniques, including devices and system implementing the techniques, to provide feedback to a user of an event when the user is wearing a wearable device. For example, the wearable device may provide high quality noise canceling audio playback to the user, lowering the user's situation awareness. The feedback may, through a spatialized audio cue, notify the user regarding events that merit attention with minimal intrusion to the noise-cancelled playback experience. The techniques include measuring ambient sound using two or more microphones on the wearable device. In some cases, at least three microphones are positioned to measure the ambient sound surrounding the user. The event is determined based on the measured ambient sound and a location attribute of the event is determined. A deep learning algorithm may be used to identify the nature and/or classification of the event and rule out events that the user prefers to ignore. Upon determining the event that need the user's attention, the user is provided feedback of the determined event and the location attribute, the feedback indicating the nature and location of the event.

In aspects, the wearable device may play, via two or more speakers thereon, an audio content canceling the measured ambient sound. For example, the two or more speakers may play audio content that has the same amplitude as the ambient sound and has an inverted phase to the ambient sound. The interference caused by the noise-canceling audio content thus cancels the ambient sound. In aspects, providing feedback to the user based on the event and the location attribute includes playing a spatialized audio cue in addition to the noise-canceling audio content. As such, the user can maintain situational awareness while escaping from the ambient sound.

As an example, determining the event based on the measured ambient sound may include measuring a magnitude of a sound level of the event and determining a location of the event relative to the wearable device using audio signals associated with the event. The location of the event may be determined based on a direction and a distance processed from the audio signals. The location attribute of the event may include at least one of the direction or the distance. For example, the user may not want to be notified regarding the user's own speech. Events related to a distance within certain threshold may be determined as the user's own speech and are therefore ignored. Similarly, although the user may be submerged in a noise-cancelling experience, the user may still be aware of events that are visually identifiable. For example, if a colleague of the user is speaking in front of the user, the user need not hear the speech to be aware of the speech, because the movement of the colleague's lips may provide sufficient visual notification to the user. As such, location attributes are important aspects of determining events that may or may not need the user's attention.

Figure 3:
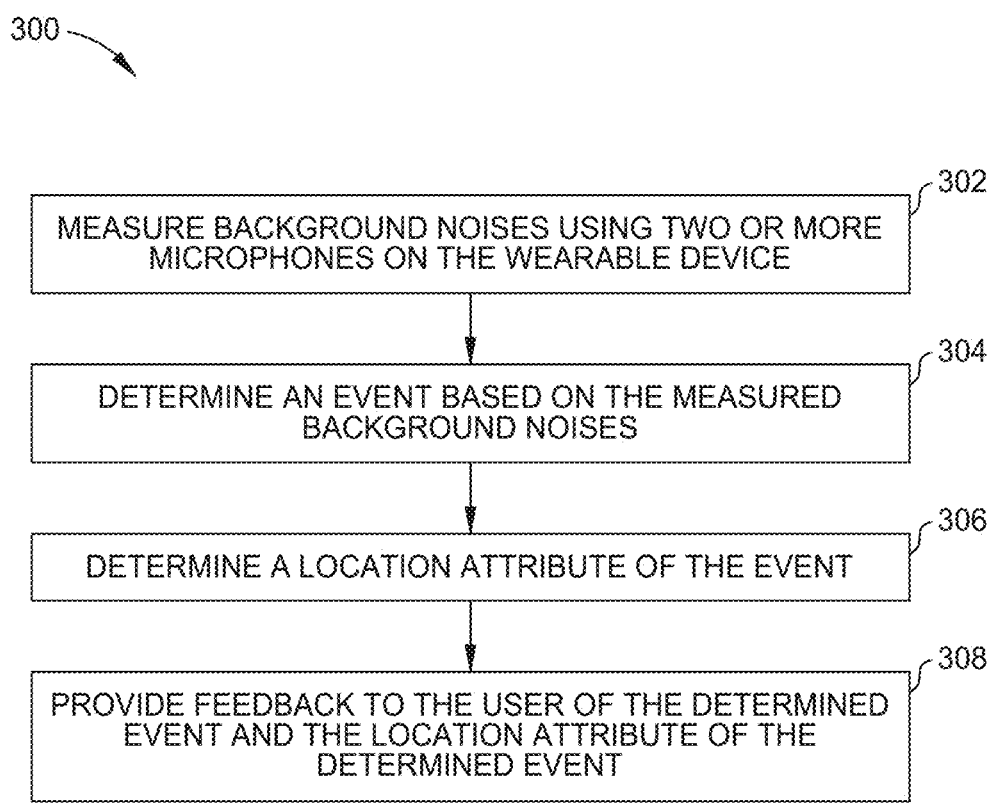
FIG. 3 illustrates example operations for providing feedback to a user of a determined event and the location attribute, according to certain aspects of the present disclosure.
Figure 4:
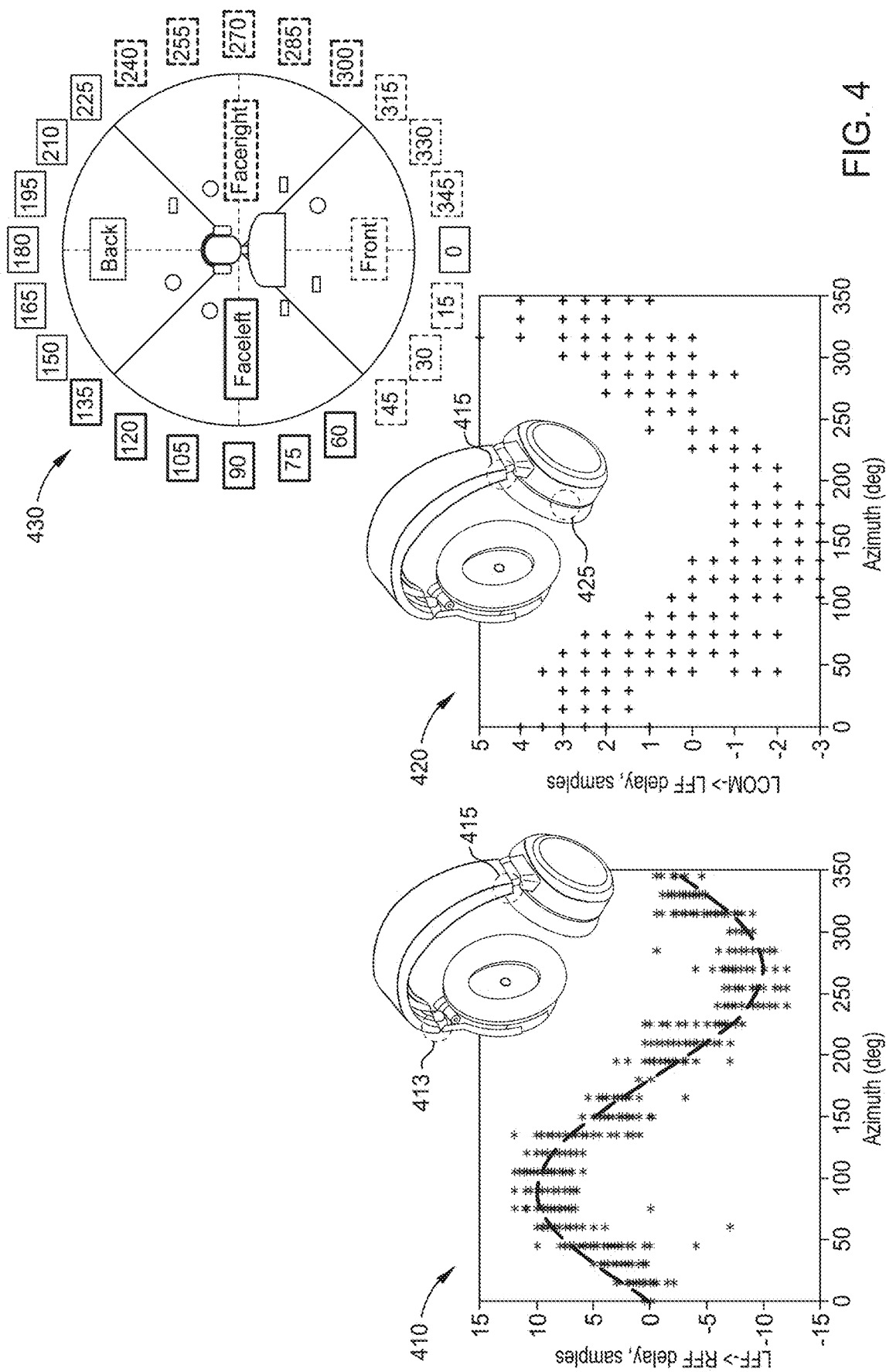
FIG. 4 illustrates example data processing for extracting location attribute of events, according to certain aspects of the present disclosure.

FIG. 3 illustrates example operations 300 for providing feedback to a user of a determined event and the location attribute, according to certain aspects of the present disclosure. The operations 300 begin, at 302, by measuring ambient sound using two or more microphones. In some cases, at least three microphones are positioned to measure the ambient sound surrounding the user. For example, block 302 may be performed by the wearable device 110 and the microphones 111 and 112 as shown in FIG. 1. Additional examples are shown in FIG. 4, where microphones 413, 415, and 425 are used to measured ambient sound. The measured ambient sound may be used for generating noise cancelation content and monitored for events that require the user's attention, as further described below.

At 304, an event determination algorithm may determine an event based on the measured ambient sound. For example, the event determination algorithm may measure a magnitude of a sound level of the event and determine a location of the event relative to the wearable device using audio signals associated with the event. The event determination algorithm may determine that the magnitude of the sound level of the event has exceeded a threshold value corresponding to the location of the event relative to the wearable device (e.g., different relative locations may have different threshold values). For example, the threshold value may vary based on the location of the event relative to the wearable device. The threshold value may increase as the location of the event becomes closer to the user, such that sounds produced by the user may be excluded.

In some cases, the event determination algorithm may monitor and calculate an average magnitude (i.e., decibel level) of the background noise and consider incoming sounds that exceeds the average decibel level as event candidates. In some cases, the event determination algorithm may use a user-input threshold value for the decibel level in determining event candidates. In some cases, the event determination algorithm may use a history or pattern of ambient sound as the reference to identify unusually loud sounds. A combination of two or more of the example strategies may be implemented.

At 306, the event determination algorithm determines a location attribute of the event. The location attribute of the event may include at least one of a direction relative to the user/wearable device and a distance between the event and the user/wearable device. In some cases, the location of the event may be determined based on a direction and a distance processed from the audio signals. For example, the two or more microphones allows the event determination algorithm to correlate and/or triangulate sounds of similar characteristics for determining the location. For example, a same sound would reach each of the two or more microphones at different times due to different travel distances, allowing for determination of the relative location to the two or more microphones. A direction and a distance may therefore be processed from the audio signals to determine the location of the event. As shown in FIG. 4, different amounts of delays (e.g., the measurements plotted in the graphs 410 and 420, respectively for pairs of 413 and 415, and 415 and 425) of a same sound signal allow the event determination algorithm to perform far-field localization of the sound signals, as shown in the sub-diagram 430.

In some cases, the event determination algorithm may determine the event based on the ambient sound by ruling out incidents of events based on the location of the event relative to the wearable device. For example, the event determination algorithm may rule out incidents that are within a certain distance to the wearable device (e.g., classifying the incidents caused by the user, such as the user's own speech, etc.), incidents that are within a field of view or in a direction (such as in the front) of the wearable device (e.g., classifying the incidents visually noticeable by the user, such as a computer notification sound from a speaker in front of the user, someone speaking before the user, etc.), or incidents that may be too far away to require the user's attention (e.g., incidents of traffic noises outside residence perimeter, etc.). Some examples are further illustrated in FIG. 5 and discussed below.

In some cases, the event determination algorithm may determine the event based on the ambient sound by ruling out incidents of events based on a recurring pattern in the audio signals associated with the event. For example, the event determination algorithm may analyze a history of recorded ambient sound to identify a pattern of ambient sound that had been ignored by the user, and determine whether a detected event fits the pattern and is to be ignored.

In some cases, the event determination algorithm may determine the event based on the ambient sound by ruling out incidents of events based on an attribute of the audio signals associated with the event. For example, the attribute of the audio signals may indicate where, what, or who the audio signals are associated with. The event determination algorithm may distinguish a fire alarm inside from a siren outside, or distinguish a speech from an acquaintance (e.g., based on previous recorded events) from a speech from a stranger.

In some cases, the event determination algorithm may determine the event based on correlating the location of the event relative to the wearable device, the recurring pattern in the audio signals associated with the event, and the attribute of the audio signals associated with the event. For example, the event determination algorithm may use deep learning to recognize the nature or meaning of the audio signals of the event. Deep learning, or machine learning in more general situations, may use artificial neural networks with representation/feature learning performed by artificial intelligence. As further discussed with respect to FIGS. 6-7 below, the event determination algorithm may employ artificial intelligence to perform deep learning over data of the location of the event relative to the wearable device, the recurring pattern in the audio signals associated with the event, and the attribute of the audio signal associated with the event. Deep learning may accurately determine which event merit the user's attention and disregard false-positive events.

Figure 5:
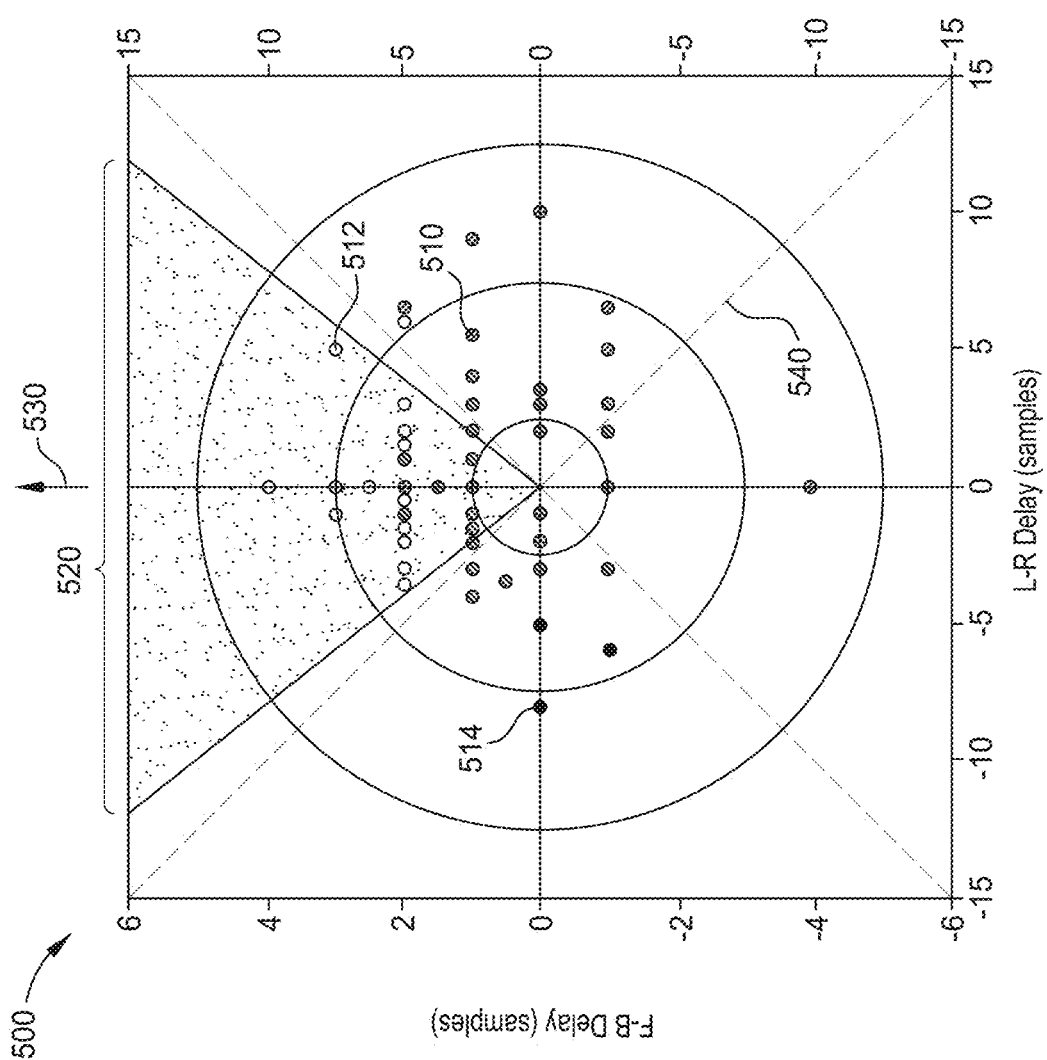
FIG. 5 illustrates an example visual presentation of determined events and the related location attributes, according to certain aspects of the present disclosure.

At 308, the user is provided with feedback of the determined event and the location attribute. For example, the feedback may include playing a spatialized sound by the two or more speakers in the wearable device, providing a direction indicative tactile notification using the wearable device, displaying a notification on one or more devices connected to the wearable device, or a combination thereof. The spatialized sound may be produced using two or more speakers of the wearable device (e.g., the speakers capable of producing a surround sound). The spatialized sound may represent the location (e.g., the location attribute) of the determined event relative to the user. The wearable device may include two or more tactile feedback mechanisms for providing directional input (e.g., left/right, up/down, etc.). FIG. 5 illustrates one example of displaying the notification in the form of a visual presentation 500 of recorded incidents.

As shown in FIG. 5, the visual representation 500 plots detected incidents over left-to-right (L-R) delays in the x-axis (i.e., time delays indicating relative distance to the wearable device), and over front-to-back (F-B) delays in the y-axis. The circular range 540 indicates a range of delay pairs consistent with far-field sound sources. The visual representation 500 includes a user's field of view 520 and a related forward direction 530. Incidents detected within the user's field of view 520 may be presumed to be ignorable. The forward direction 530, aligned with the wearable device and subject to change (e.g., as the user moves) may be used to update the coverage of incidents in the field of view 520. For example, the forward direction 530 may be defined when the wearable device is initialized and may be updated using input from one or more motion sensors, such as an accelerometer, gyroscope, or an inertia measurement unit (IMU).

A number of example incidents 510, 512, and 514 are shown in FIG. 5. The incidents 510 represent events that exceeds the threshold sound level and fall within the field of view 520. As a result, the incidents 510 are not reported to the user. The incidents 512 represent events that exceed the threshold sound level and fall outside the field of view 520. Furthermore, the incidents 512 are associated with a non-focused state of the user and therefore not reported to the user. The incidents 514 represent events that exceed the threshold sound level, that fall outside of the field of view 520, and that are associated with a focused state of the user. The incidents 514 are reported to the user, along with the associated location attribute, which may be presented as both a spatialized audio cue and by the visual representation 500.

For example, the event determination algorithm may determine that the user is in a focused state based on a pattern of motion signals measured by the wearable device. The pattern of motion signals may be measured by one or more IMUs disposed on the wearable device. As the user's situational awareness decreases in the focused state, such as when the user is sitting still reading or watching, feedback on the detected incidents are more valuable in such focused state. An example measurement 800 of motion signals is shown in FIG. 8.

Figure 8:
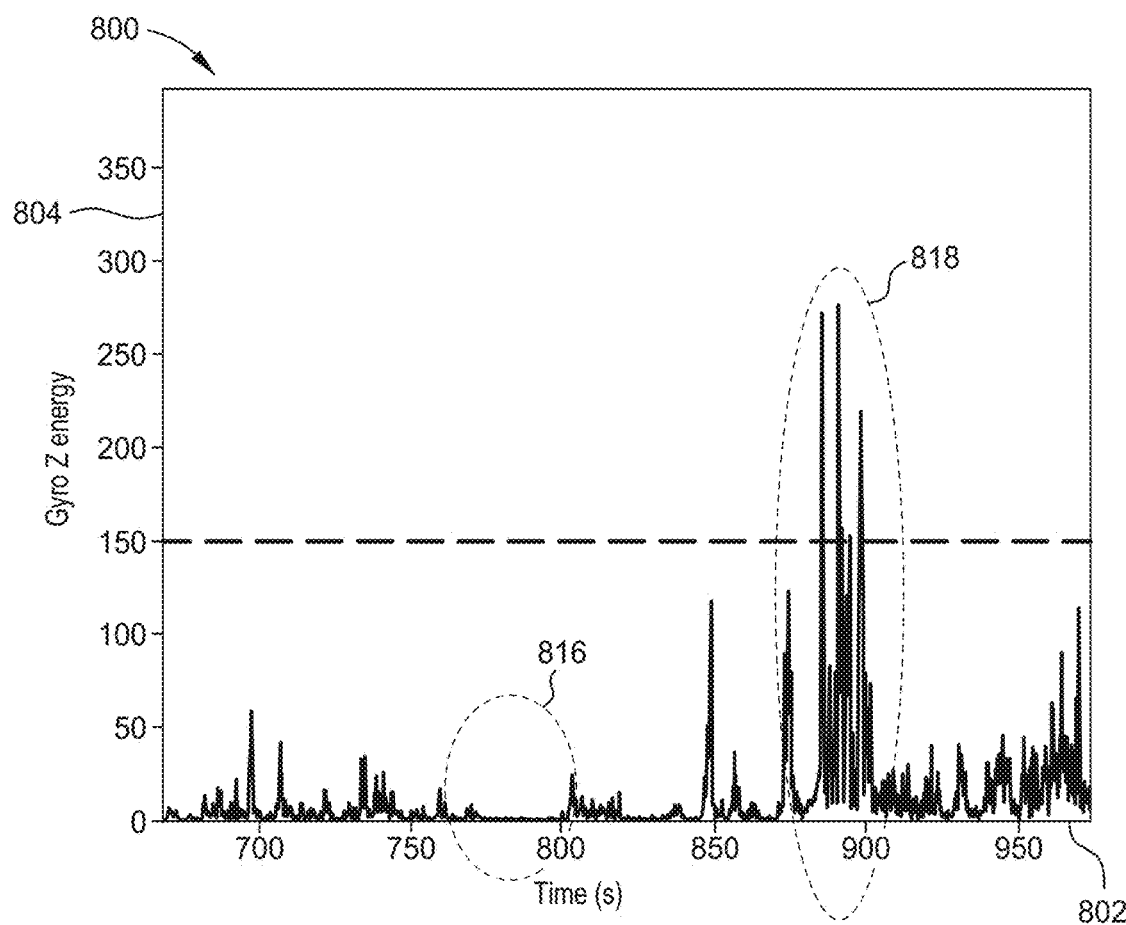
FIG. 8 illustrates motion data used to determine a state of a user, according to certain aspects of the present disclosure.

Briefly turning to FIG. 8, the x-axis 802 represents time, and the y-axis 804 represents energy measured by a gyroscope or a motion sensor in general. As shown, a low energy level pattern 816 represents a focused state of the user, while a high energy level pattern 818 represents a movement state. Incidents 512 are ignored when the user is not in the focused state because the sound signals may include noises created due to the user's own movement. In some cases, determining the user being in the focused state may include processing a pattern of motion signals. The pattern of motion signals need not indicate the user is sitting or standing still, but rather, indicate a repetitive pattern such as pacing or rocking back and forth.

One important aspect of the present disclosure pertains to determining the event (such as the incident 514) using deep learning based on various layers of data, including audio attributes, location attributes, and the status of the user. At a high level, the deep learning aspect detects events based on multiple classes or categories, by analyzing various attributes of audio signals (e.g., distinguishing the source and nature of a sound signal). Second, the deep learning aspect may decide a class or category of each detected event (e.g. voice, alarm, knock, etc.) and an associated priority level. The deep learning may be supervised (e.g., constantly receiving user feedback), semi-supervised (e.g., occasionally receiving user feedback), and unsupervised (e.g., not receiving user feedback).

Figure 6A:
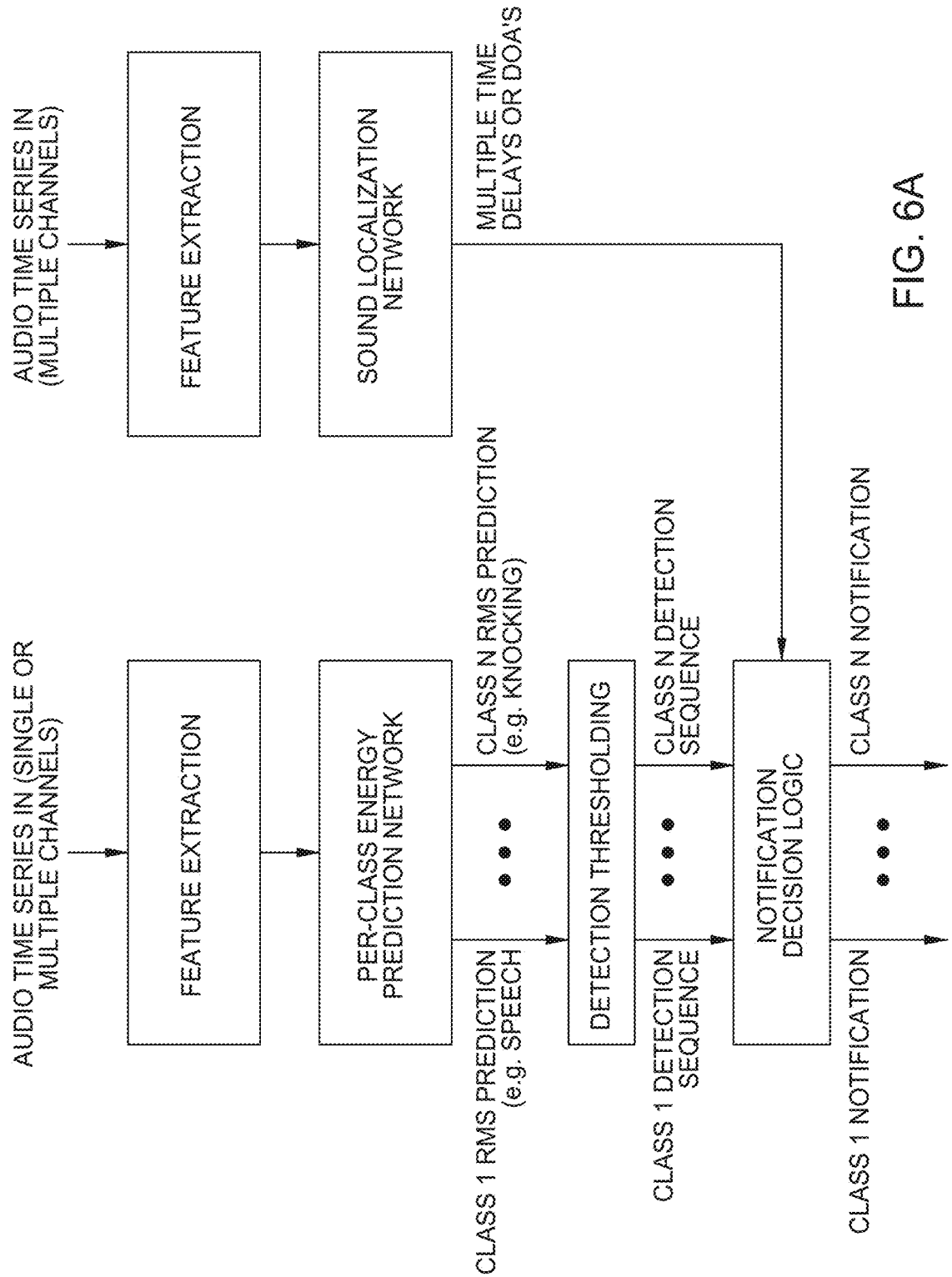
FIG. 6A illustrates an example process for determining events that require user's attention, according to certain aspects of the present disclosure.

FIG. 6A illustrates an example process for determining events that require a user's attention, according to certain aspects of the present disclosure. As shown, two or more feature extraction modules may receive audio time series in one or more channels. Features are then extracted and provided to a per-class energy prediction network (e.g., a machine learning network or a neural network) as well as a sound localization processing network for determining the location attributes of the extracted features. In some cases, the feature extraction is deterministic processing. In some cases, the feature extraction produces "mel-spectrogram" images. In audio time series in multiple channels, the feature extraction process may be followed by processing in a sound localization network, which processes a directional output of the ambient sound.

The two networks may then determine what feedback may be provided to the user by applying event threshold and decision logic based on the module of event threshold and decision logic, which then outputs decisions per sound class. In some cases, the example of FIG. 6A uses thresholding an rms estimate for each sound class (e.g., not limited to 0 to 1) to determine a corresponding detection sequence. In some cases, the detection thresholding process may apply per-class or custom thresholds to the event detection. The output signals in FIG. 6A ("class N decision") may define the user will be notified with the feedback.

Figure 6B:
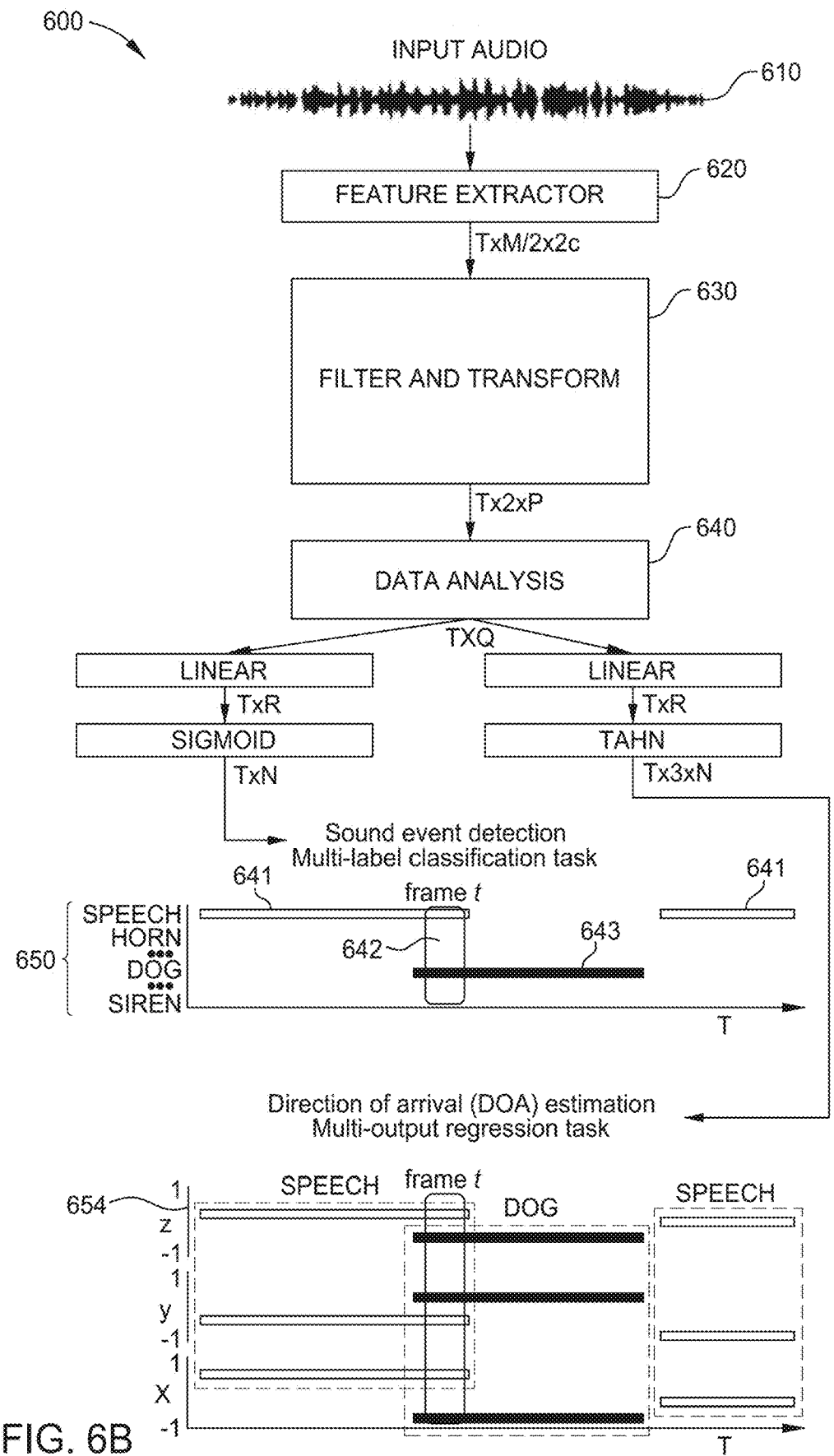
FIG. 6B illustrates an example deep learning process for determining events that require user's attention, according to certain aspects of the present disclosure.

A second example of the deep learning process 600 for determining events that require the user's attention is shown in FIG. 6B. The deep learning process 600 may be implemented as an alternative to (e.g., separate from) the example shown in FIG. 6A, or may be implemented together with the example shown in FIG. 6A, similar to another example illustrated in FIG. 6C below. As shown, the deep learning process 600 begins at 610 by receiving an input audio. Although illustrated as a single-channel audio stream, the input audio often includes at least two channels of recordings (e.g., for localization analysis). The two or more channels of input audio may be analyzed in parallel. At 620, features in the input audio are extracted. The features may be identified based on magnitude, frequency, patterns, or a combination thereof.

At 630, filters are applied to the extracted features and to further classify events associated with the features of the input audio. For example, the feature extraction process may include filtering and transformation on the input audio signals (e.g. converting to a frequency domain "melspectrogram"). In some cases, a "per-class" energy prediction network implementing the processes at 630 may include a neural network that predicts per-class rms energy based on the extracted features. In some cases, the feature extraction process in FIG. 6B may be different from the processes performed in the "feature extraction" of FIG. 6A.

At 640, analysis of localization based on two or more channels of input audio is performed, resulting in two recognition outputs 650 and 654. The output 650 includes sound event detection with multi-label classification, which may indicate the nature of the events detected, such as speech 641, sounds 642 associated with car horns, dog barking 643, or siren (not shown). The detected sounds are recorded along a time line T, with each frame having a period of t. The output 654 provides direction of arrival estimation, such that the directions of the events detected, such as speech 641, sounds 642 associated with car horns, dog barking 643, and may be determined by determining an X-Y-Z coordinate of the origin of each event.

In some cases, the "sigmoid" layer leading into 650 may implement a probability-based detection approach where we threshold a probability between 0 and 1 (this is what a sigmoid block produces) to determine a detection sequence for each class as in 650. In some cases, the processes at 630 may be performed using a non-recurrent network. The processes at 640 may be performed using a recurrent network.

Figure 6C:
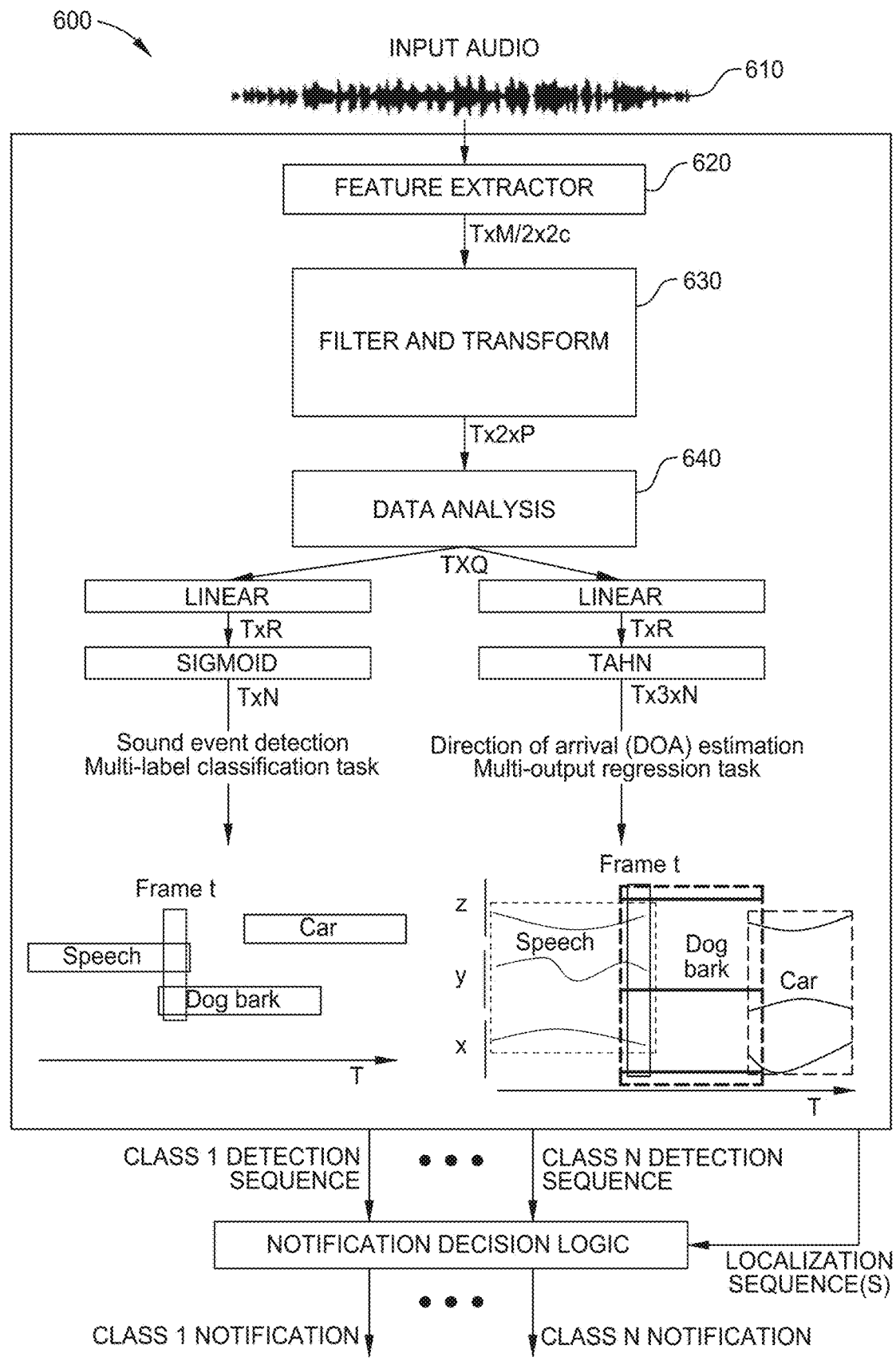
FIG. 6C illustrates an example deep learning process for determining events, according to certain aspects of the present disclosure.

FIG. 6C illustrates another example of using neural network for determining whether and how feedback may be provided to the user. As shown, FIG. 6C illustrates thresholding and decision steps being separate.

Figure 7:
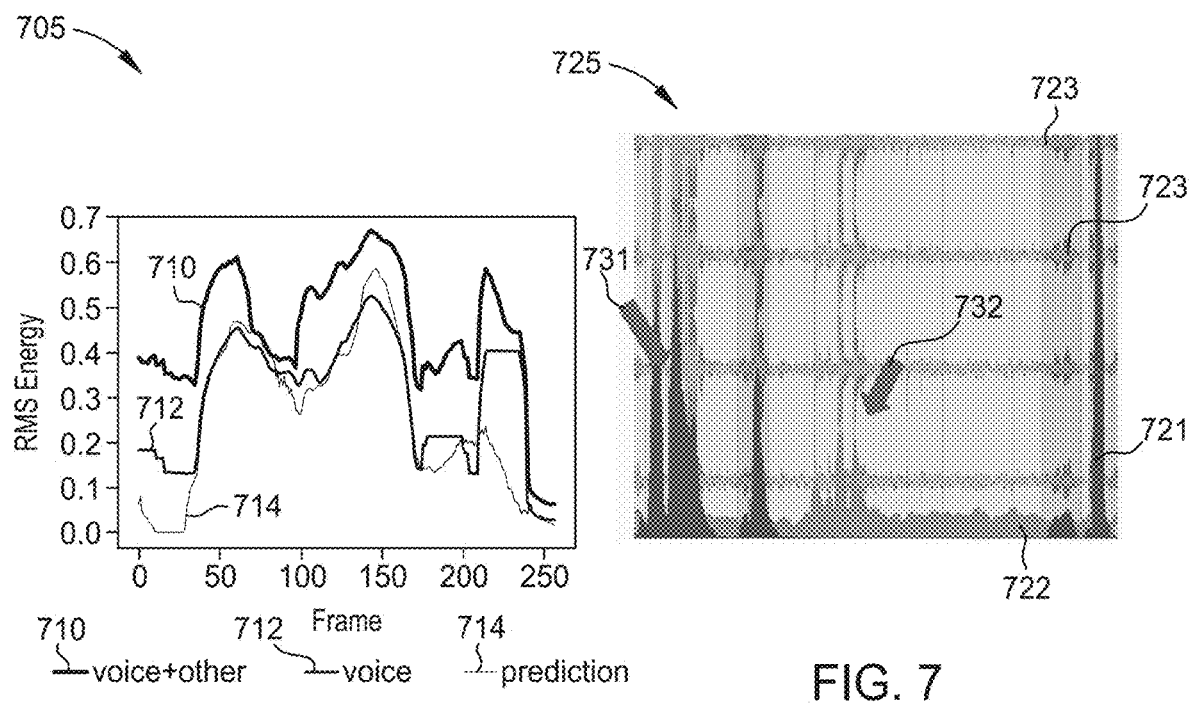
FIG. 7 illustrates an example process for determining events based on sound energy, according to certain aspects of the present disclosure.

FIG. 7 illustrates output of an example deep learning model. The output is a per-class energy time-series prediction. A detection decision may be produced by applying a threshold to the prediction. As shown in FIG. 7, the plot 705 shows using sound energy (y-axis) to determine measured and predicted events along time (frames in the x-axis). For example, three example energy profiles 710, 712, and 714 are shown. The profile 710 may include voice and other sound signals, which may correspond to the audio signals 723 of the graph 725 to the right. The profile 712 represents the quantity of the energy of voice signals present. The event determination algorithm may be trained to predict, as shown in the profile 714, an expected energy variation of voice-only activity and ignores the energy of non-speech events. For example, in the graph 725, the events 731 or 721 represent the voice-only energy portion of the recording signals 723. The signals 722 shows high energy during a knocking sound 732, while the voice energy portion during this time remains small.

In some aspects, the techniques variously described herein can be used to determine contextual information for a wearable device and/or the user of the wearable device. For instance, the techniques can be used to help determine aspects of the user's environment (e.g., noisy location, quiet location, indoors, outdoors, on an airplane, in a car, etc.) and/or activity (e.g., commuting, walking, running, sitting, driving, flying, etc.). In some such aspects, the audio data received from the wearable device can be processed at the computing device to determine such contextual information and provide new or enhanced experiences to the user. For example, this could enable playlist or audio content customization, noise cancellation adjustment, and/or other settings adjustments (e.g., audio equalizer settings, volume settings, notification settings, etc.), to name a few examples.

As wearable devices (e.g., headphones or earbuds) typically have limited resources (e.g., memory and/or processing resources), using the techniques described herein to offload the processing of data from sensors of the wearable device(s) to a computing device while having a system to synchronize the audio data at the computing device provides a variety of applications. In some aspects, the techniques disclosed herein enables the computing device to automatically identify an optimized or a most favorable configuration or setting for the synchronized audio capture operations, as discussed below.

Example Feedback Based on Customized Configurations of Different Thresholds

Aspects of the present disclosure further provide techniques, including devices and system implementing the techniques, to provide feedback to a user of an event defined by a customized threshold that varies in different configuration events corresponding to different situational criteria. For example, the wearable device may determine events using different thresholds in different situations. The different thresholds may be configured by the user, set by default, updated by a service, or updated based on new data (e.g., machine learning). In aspects, the thresholds are configurable decibel or volume levels corresponding to situations characterized as configuration events. Each configuration event may be defined by one or more parameters, such as sound classes (e.g., speech, melody, alarm, barking, etc.), location attributes (e.g., distance and direction from the wearable device, as aforementioned), time, date, location of the wearable device (e.g., home, office, etc.), and other parameters. For example, a user may set different thresholds for the same sound class in different rooms at home, such that a specific sound (e.g., doorbell) attenuated may nonetheless cause feedback to the user. The parameters are generally referred to as situational criteria to include various types of data.

In aspects, each of two or more different situational criteria may include a customization configuration of at least one of: the threshold associated with the determined event, a location attribute of the event, or the feedback to the user. In some cases, the situational criterial further include a location attribute relative to the wearable device determined based on the ambient sound measured using two or more microphones of the wearable device. For example, the threshold, configurable by the user, may include a minimal or maximal distance corresponding to one specific situational criterion. The threshold may also include a direction corresponding to one specific situational criterion. The situational criteria may correspond to specific physical locations of the wearable device. For example, the situational criteria of sound distance and direction for a home location would be different from the situational criteria of sound distance and direction for an office location. The user may configure the situational criteria such that, when at home, certain sounds from a first distance, in a first direction, exceeding a first threshold may result in a feedback provided to the user, while in the office, certain sounds from a second distance, in a second direction, exceeding a second threshold may result in another feedback.

Figure 9:
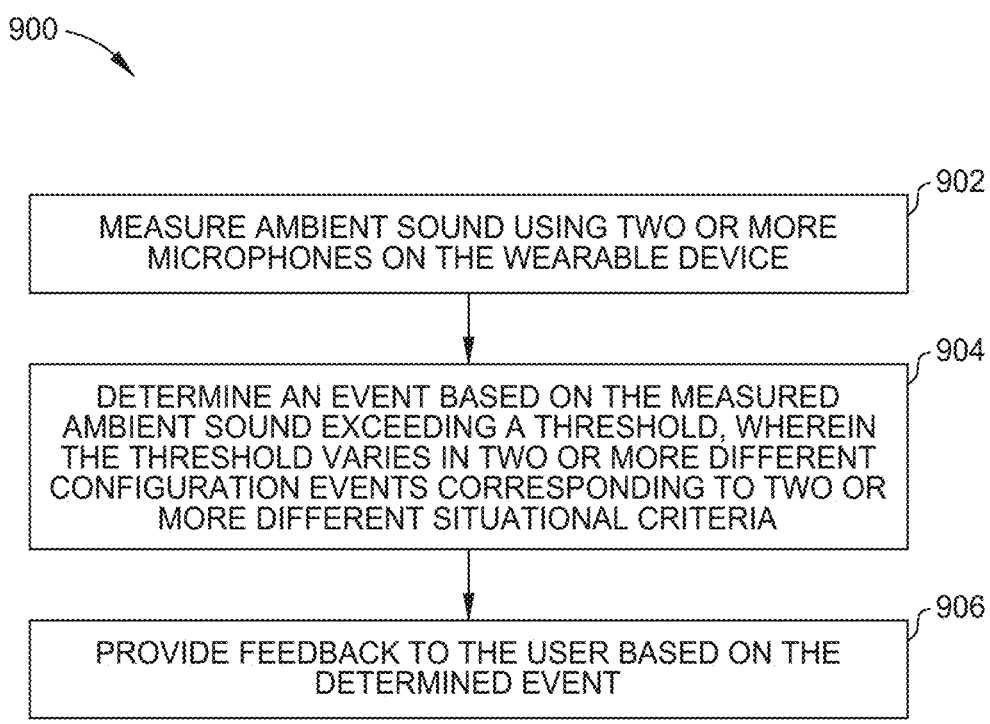
FIG. 9 illustrates example operations for providing feedback to a user of a determined event and the location attribute, according to certain aspects of the present disclosure.

FIG. 9 illustrates example operations 900 for providing feedback to a user of a determined event, according to certain aspects of the present disclosure. The operations 900 may be, at least, partially performed by a wearable device, such as the wearable device 110 of FIG. 1. The operations 900 differ from the operations 300 of FIG. 3 in that operations 900 may determine an event by applying a situation specific threshold, which varies in different situations characterized by different parameters, or situational criteria. For example, in addition to using location attribute as discussed in operations 300, operations 900 also consider customized sensitivity or threshold, sound properties (e.g., types or classes of sound), as well as customized feedback, as discussed below.

The operations 900 begin, at 902, by measuring ambient sound using two or more microphones. This is similar to operations 300. The two or more microphones allow for detecting the ambient sound location relative to a wearable device, such as the wearable device 110 and the microphones 111 and 112 as shown in FIG. 1. For example, the multiple microphones may enable estimation of the direction of arrival by estimating time delays between different pairs of microphones. The distance may be determined indirectly from the sound intensity, reverberation, and some other quantities. Other location determination techniques may be similarly applied. Additional examples are shown in FIG. 4, where microphones 415 and 425 are used to measured ambient sound. The measured ambient sound may be used for generating noise cancelation content and monitored for events that require the user's attention.

At 904, an event may be determined based on the measured ambient sound exceeding a threshold. The threshold may vary for two or more different configuration events corresponding to two or more different situational criteria. For example, the threshold may be customized by the user or varies by default depending on different sound properties. As such, the wearable device may behave differently in different situations, such as during a call in a conference setting, in an audio playback scenario, or in a concentration mode canceling all surrounding noises.

At 906, based on the determined event, the user is provided with a corresponding feedback. For example, the feedback may include playing a spatialized sound by the two or more speakers in the wearable device, providing a direction indicative tactile notification using the wearable device, displaying a notification on one or more devices connected to the wearable device, or a combination thereof, as discussed above.

In aspects, each of the two or more different situational criteria includes a customization configuration of at least one of: the threshold associated with the determined event, a location attribute of the event relative to the wearable device, or a feedback to the user based on the determined event. The customization configuration may be input by the user. The customization configuration may include a default factory configuration. For example, FIGS. 10 and 11 illustrate example interfaces for adjusting customization configuration of situational criteria, according to certain aspects of the present disclosure.

Figure 10:
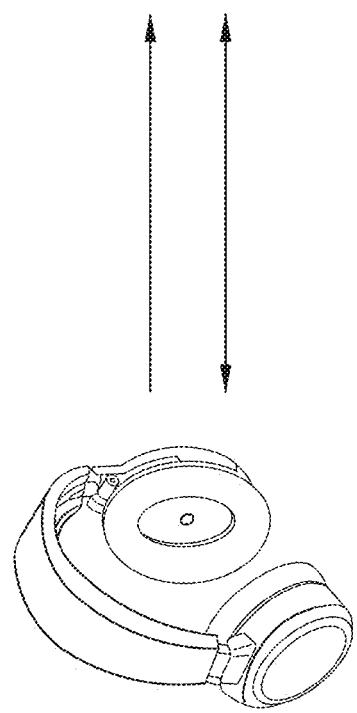
FIG. 10 illustrates an example interface for adjusting customization configuration of situational criteria, according to certain aspects of the present disclosure.
Figure 11:
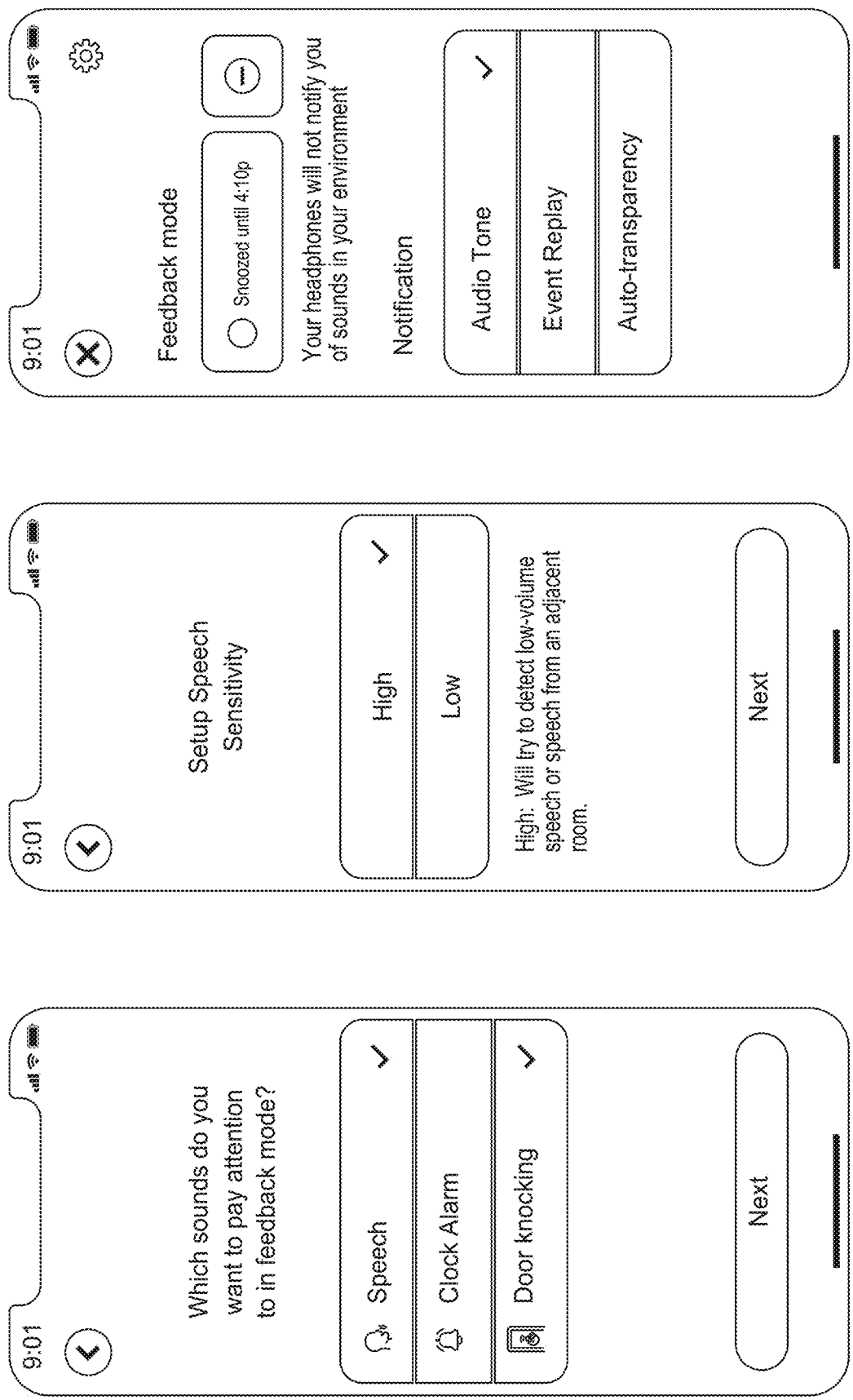
FIG. 11 illustrates an example interface for adjusting customization configuration of situation criteria, according to certain aspects of the present disclosure.

As shown in FIG. 10, a user may manage notifications by selecting one or more of the notification types, such as audio alerts, desktop notifications, or both. In addition to the notification type, customization configurations shown in FIG. 10 may also include event sensitivity definitions for different sound classes, such as speech, alarms/timers, and loud events as shown. The event sensitivity may indicate a minimum magnitude (e.g., a valley) of a sound wave or a range of detectable frequencies. In some cases, the sensitivities may be descriptive and intuitive for users, such as by providing feedback of "speech in the same room" and "speech in the next room." Part of the algorithm may match measured sound levels to these descriptions, depending on specific scenarios. The selected event sensitivity may be associated with a decibel level defining the event threshold. The threshold value indicates a minimal sound level that must be exceeded in order to trigger the feedback to the user. In other words, the wearable device or a processing device connected with the wearable device may first identify an appropriate sound class of the ambient sound, and monitors when such ambient sound would exceed the defined threshold.

In some cases, the sound class may include at least one of speech, a background sound (e.g., loud events shown in FIG. 10), or a musical sequence (i.e., a variation of sounds with a recognizable pattern). In some examples, the background sound may also include an alarm, a foot step noise, a traffic noise, or a pattern of sounds in general. In some cases, FIG. 10 may represent a graphical user interface (GUI). The GUI may be on the wearable device, on a computer device connected to the wearable device, or both. The computer device may any computing device in communication with the wearable device, such as the computing device 120 of FIG. 1.

Although FIG. 10 illustrates that the event sensitivity configurations for the example sound classes include discrete optional levels: off, low, medium, and high (or corresponding descriptions that are easy for users to understand), a continuous sensitivity level configuration may be provided, such as in a form of a slide bar. In some cases, complicated threshold profiles (such as a profile of magnitudes in a range of frequencies) may be loaded in the configurations. Furthermore, in some cases, the threshold configurations may be trained, acquired, or recognized by the wearable device (e.g., by machine learning) based on the user's reactions to the ambient sound. For example, the user's reactions may be measured using various motion sensors, in addition to vocal responses.

As shown in FIG. 11, sound class selection, detection sensitivity, and feedback or notification modes may be configured by the user. FIG. 11 may be considered as an example graphical interface implementing various aspects of FIG. 10.

In aspects, the feedback provided to the user further includes playing a recorded copy of the ambient sound to the user. For example, upon determining an event that satisfies certain situational criteria, such as a speech from a colleague in a work setting, the ambient sound (i.e., the speech) is recorded and played to the user in the wearable device, which may have noise-cancelled the speech in the first place (i.e., prior to processing the ambient sound and recognizing that the ambient sound meeting the speech situational criteria). The recording of the ambient sound includes at least two channels (e.g., binaural) to preserve spatial characteristics of the ambient sound to provide location attributes as discussed in various aspects herein. Playing the recorded sound copy may be referred to as one or more operations described below (e.g., auto-transparency, event replay, etc.). As such, even though the wearable device may completely canceled the ambient noise in the first place, important events or sound information is saved and available to the user.

In aspects, notifications or feedback may be based on 1: spatialized tones or cues, 2: auto-transparency (i.e. automatically changing headphones to a transparent noise cancelling state), and 3: event replay which we also refer to as "pass-through". In some cases, playing back a recorded event may have some delay relative to what a user would hear in real life, since the processor may need time to make a detection decision or process/enhance sound events. In some cases, when a noise cancellation state is not changed, a built-in "rewind" may take place.

For example, auto-transparency may put a wearable device into a mode where the device passes through the audio of the outside world in real-time in a manner that tries to best simulate what it would be like. Event replay may record a sound event and then plays that sound event at some time in the future, such as in response to a user providing input that they want to hear the event (e.g., shake head, push a button, etc.).

In another example, auto-transparency may trigger, e.g., if the general sound around the user exceeds a certain decibel level, such as to allow the user to figure out what's going on in the area. However, event replay might trigger, e.g., if speech is detected in a window that is pre-defined based on the opening of the user's cubicle, where the speech is recorded and then played back to the user (which may also then cause the wearable to go into auto-transparency mode to allow the user to engage in the conversation).

In aspects, a self-voice (detected, e.g., using known voice activity detection (VAD) techniques) may be used to keep the wearable in a transparent state after the algorithm of this application causes the headphones to enter the transparent state (using auto-transparency). An optional feature of activating the self-voice may be set by default or user customizable.

In aspects, a timer may optionally be used (which may be set to a default time and/or user customizable) to determine when to revert from the auto-transparency mode (e.g., return to noise-cancelling level that was set before auto-transparency triggered). Alternatively, reversion from the auto-transparency mode may occur in another manner, such as in response to user input (e.g., button press, head turn).

In aspects, when a user may clearly hear a speech regardless of the presence of the wearable device (e.g., based on sound levels detected by the feedback microphone), the wearable device may automatically duck audio and change state to transparency without having the user to further operate on the wearable device or remove the wearable device. In other words, the wearable device automatically enters into a transparency mode when outside conversations are detected.

In some cases, the wearable device may use an internal microphone (e.g., a feedback microphone near the speakers of the wearable device) to determine whether the detected event is audible to the user in the first place, for example, in case when the wearable device does not completely cancel out the ambient sound. If the ambient sound is indeed audible to the user, the wearable device may not immediately playback the recorded event and may provide the user a notification of the availability of the recording. In some cases, the wearable device may amplify or attenuate the recorded copy of the ambient sound based on data gathered by the internal microphone. For example, the wearable device may adjust the volume of the playback to be substantially similar to the existing audio output such that the user may comfortably listen to the recording. In some cases, the amplification or attenuation of the recorded copy of the ambient sound may be applied to certain specific bandwidths or content of the ambient sound. For example, background noises of the ambient sound may be attenuated while the speech may be amplified, or vice versa. Other digital processing may also be used to extract data of concern to the user.

In some cases, amplifying or attenuating the recorded copy of the ambient sound may be triggered by a movement of the wearable device. For example, a detection or measurement of the wearable device turning or moving toward a source of sound may trigger a replay of the recorded copy (immediately or at a preconfigured delay in response to the movement), as well as an action to modify the recorded copy, including amplifying or attenuating at least a portion of the recorded copy of the ambient sound. The movement data may be combined with other data of reaction collected from the user for analyzing a response pattern (or motion pattern, or movement pattern), as discussed below.

In some cases, the internal microphone may be used to provide a feedback control over the recording playback, such that the amplification or attenuation may conform to certain user preferences or profiles. For example, if when the ambient sound includes a mixture of sounds of different sound classes, such as a speech over an background song and a fire alarm, the internal microphone may determine that the user had already heard the fire alarm (i.e., the wearable device has not fully cancelled the alarm sound) and the playback of the recorded ambient sound needs not include the fire alarm component. Similarly, the speech component may have been only picked up by the microphones of the wearable device and the internal microphone detects that the user has not been able to perceive the speech component over other sounds, so that the wearable device may amplify the speech component at a greater scale than the background song.

In some cases, the playback of the recorded ambient noise may be delayed, postponed, or offset to another time. This may be referred to as a rewind operation. The rewind operation may be implemented when more processing time is required when the recoded ambient sound includes complicated signals, or when the user customizes or provides certain rules such that certain sound classes or sounds of certain location attributes may trigger such rewind operation.

In some cases, the rewind operation, as well as other sound replay operations (e.g., including amplification and attenuation), may be correlated with a motion pattern of the user. For example, as discussed above, a general rule of configuration may be identified based on input by the user. The input may be a motion response recorded by one or more motion sensors in the wearable device, such as an accelerometer, an inertia measurement unit (IMU), vibration motion sensors, or other motion sensors. The movement pattern, such as a repeated head turning response, a walking response, or other movement responses, may be correlated with the sound event as well as the rewind or replay operations. As such, when both the sound event and the motion response are detected, the wearable device may perform the rewind or replay operation automatically without further input from the user.

In aspects, the wearable device may correlate the ambient sound and the location attribute of the ambient sound for a period of time, i.e., tracking the motion of the ambient sound. The tracked motion may be used to generate a salience map, which maps a variation of the ambient sound over a period of time at different locations. The wearable device may also measure a movement record of its own over the same period of time. Based on the salience map and the movement record of the wearable device, a response of the user may be determined based on the correlated relationship. For example, the user's response may be conditioned upon the movement of the ambient sound, such as an approaching speech may trigger the user leaning toward the sound direction, and rewind or replay operations may then be performed.

In aspects, for concerns over power consumption or processing capacity, the wearable device may ask other connected devices to share data processing workload. For example, a multi-stage processing architecture may be implemented for saving bandwidth or processing power at the wearable device. In one example, the wearable device may transmit (partially or completely) the measured ambient sound to a second device, such as the computing device 120 of FIG. 1, for partial or complete computation or processing. In some cases, the second device or additional devices may have a greater processing capacity than the wearable device, in order to reduce the overall processing time. After processing, the wearable device may receive the determined event and the corresponding feedback to provide to the user.

In some aspects, the techniques variously described herein can be used for a multitude of audio/video applications. In addition, the techniques described herein can enable wireless captured audio for audio or video messages without interrupting a user's music or audio playback. Thus, the techniques described herein enable the ability to produce immersive and/or noise-free audio for videos using a wireless configuration. Moreover, as can be understood based on this disclosure, the techniques described enable schemes that were only previously achievable using a wired configuration, so the techniques described free the user from the undesirable and uncomfortable experience of being tethered by one or more wires.

It can be noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware aspect, an entirely software aspect (including firmware, resident software, micro-code, etc.) or an aspect combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

What is claimed is:

1. A method for providing feedback to a user of a wearable device comprising:
    measuring ambient sound using two or more microphones on the wearable device;
    determining an event based on the measured ambient sound exceeding a threshold, wherein the threshold varies in two or more different configuration events corresponding to two or more different situational criteria; and
    providing feedback to the user based on the determined event and the measured ambient sound exceeding the threshold,
    wherein the two or more configuration events are defined by at least two of i) a decibel level, ii) a property of the ambient sound, or iii) a location relative to the user.

2. The method of claim 1, wherein each of the two or more different situational criteria comprises a customization configuration on at least one of:
    the threshold associated with the determined event;
    a location attribute of the event relative to the wearable device; or
    the feedback to the user based on the determined event.

3. The method of claim 2, wherein the customization configuration is input by the user.

4. The method of claim 3, further comprising:
    associating the customization configuration and the location attribute of the determined event relative to the wearable device; and
    identifying a pattern based on the input by the user and the association for determining a general rule of configuration based on the location attribute.

5. The method of claim 2, wherein the customization configuration comprises a default factory configuration.

6. The method of claim 1, wherein each of the two or more different situational criteria comprises a location attribute relative to the wearable device, the location attribute determined based on the ambient sound measured using the two or more microphones of the wearable device.

7. The method of claim 6, wherein the threshold comprises a minimal or maximal distance corresponding to one of the two or more different situational criteria.

8. The method of claim 6, wherein the threshold comprises a direction corresponding to one of the two or more different situational criteria.

9. The method of claim 6, wherein each of the two or more different situational criteria corresponds to a physical location of the wearable device.

10. The method of claim 1, wherein each of the two or more different situational criteria comprises a sound class including at least one of a speech, a background sound, or a musical sequence.

11. The method of claim 10, wherein the background sound comprises an alarm, a foot step noise, a traffic noise, or a pattern of sounds.

12. The method of claim 11, wherein the threshold comprises a minimal sound level corresponding to one of the two or more different situational criteria.

13. The method of claim 11, wherein the threshold corresponds to a sensitivity of the one of the two or more different situational criteria.

14. The method of claim 1, wherein providing the feedback comprises playing a recorded copy of the ambient sound to the user.

15. The method of claim 14, wherein playing the recorded copy comprises amplifying or attenuating the recorded copy of the ambient sound based on data gathered by a feedback microphone in the wearable device.

16. The method of claim 15, wherein amplifying or attenuating the recorded copy of the ambient sound is triggered by a movement of the wearable device.

17. The method of claim 2, further comprising:
correlating the ambient sound and the location attribute for a period of time;
generating a salience map mapping a variation of the ambient sound over the period of time at different locations;
measuring a movement record of the wearable device over the period of time; and
determining a response of the user based on a relationship between the movement record and the salience map.

18. The method of claim 2, further comprising:
correlating the ambient sound and the location attribute for a period of time;
generating a salience map mapping a variation of the ambient sound over the period of time at different locations;
measuring a movement record of the wearable device over the period of time; and
determining a response of the user based on a relationship between the movement record and the salience map.

19. The method of claim 1, wherein determining the event further comprises:
transmitting the measured ambient sound to a second device for processing; and
receiving, from the second device, the determined event and the corresponding feedback to provide to the user, wherein the second device has a greater processing capacity than the wearable device.

20. A system comprising:
a wearable device having two or more microphones configured to measure ambient sound; and
a computing device connected with the wearable device, the computing device configured to:
receive the measured ambient sound from the wearable device;
determine an event based on the ambient sound exceeding a threshold, wherein the threshold varies in two or more different configuration events corresponding to two or more different situational criteria; and
cause feedback to be provided to a user based on the event and the ambient sound exceeding the threshold,
wherein the two or more configuration events are defined by at least two of i) a decibel level, ii) a property of the ambient sound, or iii) a location relative to the user.

21. The system of claim 20, wherein the wearable device is configured to:
assess a time requirement for locally determining an event based on the ambient sound exceeding the threshold; and
when the time requirement exceeds a waiting period, transmit the measured ambient sound to the wearable device for determination.

22. A non-transitory computer readable medium storing instructions that when executed by a wearable device cause the wearable device to:
measure ambient sound using two or more microphones on the wearable device;
determine an event based on the measured ambient sound exceeding a threshold, wherein the threshold varies in two or more different configuration events corresponding to two or more different situational criteria; and
provide feedback to a user based on the determined event and the measured ambient sound exceeding the threshold,
wherein the two or more configuration events are defined by at least two of i) a decibel level, ii) a property of the ambient sound, or iii) a location relative to the user.

23. The method of claim 1, wherein the two or more configuration events are further defined by a physical location of the user.

* * * * *